(12) United States Patent
Willett

(10) Patent No.: US 9,108,653 B2
(45) Date of Patent: Aug. 18, 2015

(54) ADAPTIVE WHEELED CARRIER AND TRANSPORT DEVICE

(71) Applicant: Timothy C. Willett, Suamico, WI (US)

(72) Inventor: Timothy C. Willett, Suamico, WI (US)

(*) Notice: Subject to any disclaimer, the term of this patent is extended or adjusted under 35 U.S.C. 154(b) by 0 days.

(21) Appl. No.: 14/094,786

(22) Filed: Dec. 2, 2013

(65) Prior Publication Data

US 2015/0123361 A1  May 7, 2015

Related U.S. Application Data

(60) Provisional application No. 61/732,373, filed on Dec. 2, 2012.

(51) Int. Cl.
  *B62B 1/00* (2006.01)
  *B62B 1/18* (2006.01)
  *B62B 1/10* (2006.01)
  *B62B 3/00* (2006.01)

(52) U.S. Cl.
  CPC . *B62B 1/002* (2013.01); *B62B 1/10* (2013.01); *B62B 1/18* (2013.01); *B62B 3/00* (2013.01)

(58) Field of Classification Search
  CPC ............ B62B 1/002; B62B 1/18; B62B 1/10; B62B 3/00; B62B 1/20; B62B 1/202; B62B 1/204; B62B 1/206; B62B 1/00; B62B 1/02; B62B 1/04; B62B 1/12; B62B 1/16
  USPC ........................................................ 280/653
  See application file for complete search history.

(56) References Cited

U.S. PATENT DOCUMENTS

| | | | | |
|---|---|---|---|---|
| 4,740,008 A | * | 4/1988 | Johnson ........................ | 280/475 |
| 4,789,171 A | * | 12/1988 | Porter ......................... | 280/47.18 |
| 5,873,582 A | * | 2/1999 | Kauffman et al. ........... | 280/7.12 |
| 5,924,708 A | * | 7/1999 | Bisaillon et al. ............ | 280/47.26 |
| 6,186,523 B1 | * | 2/2001 | Aielli .......................... | 280/47.31 |
| 6,474,007 B1 | * | 11/2002 | Sueshige et al. .............. | 37/266 |
| 8,534,682 B2 | * | 9/2013 | Volin .......................... | 280/47.31 |
| 8,985,619 B2 | * | 3/2015 | Celli ............................ | 280/653 |
| 2007/0096414 A1 | * | 5/2007 | Beaudoin ................... | 280/47.31 |

* cited by examiner

*Primary Examiner* — John Walters
*Assistant Examiner* — Brian Swenson

(57) ABSTRACT

A wheeled carrier for manual movement of material includes a base frame with a pair of frame rails. The frame rails are turned down at the front end with a first bracket connecting the rails and providing a mounting point for at least one wheel and a receiver between the frame rails. The wheel is positioned so that it does not extend above either of the frame rails. A second bracket extends between the frame rails and includes a release mechanism positioned between the frame rails. An attachment including a yoke may be releasably mounted to the base frame. The yoke extends between the receiver of the first bracket and the release mechanism of the second bracket and engages the receiver and the release mechanism. The attachment further including a load carrying arrangement configured to rest on the frame rails above the at least one wheel without engaging the wheel.

14 Claims, 53 Drawing Sheets

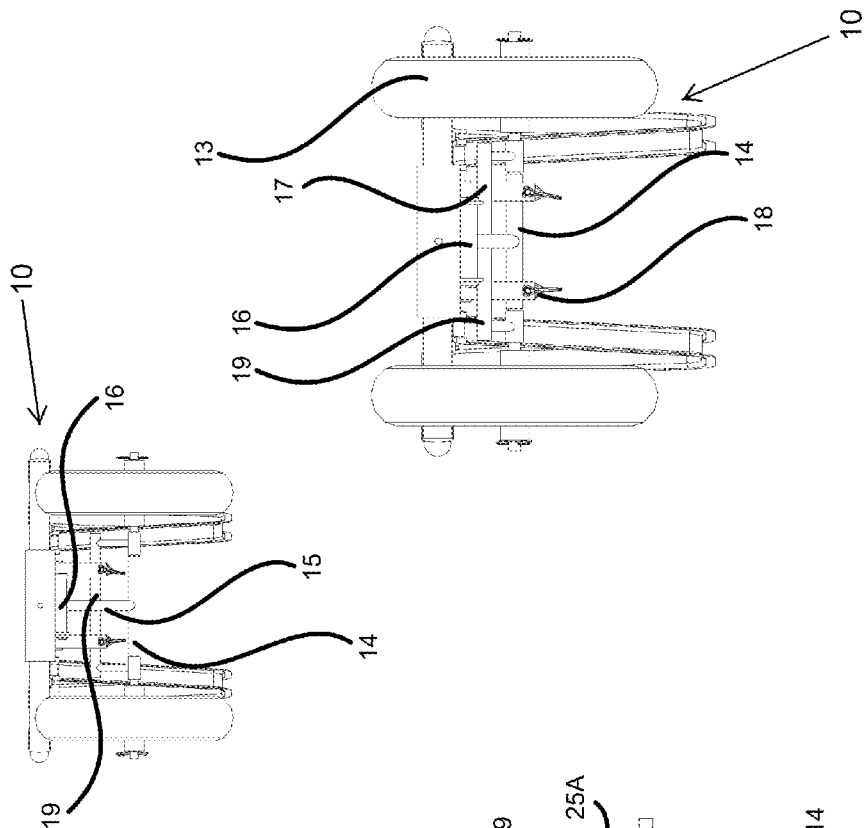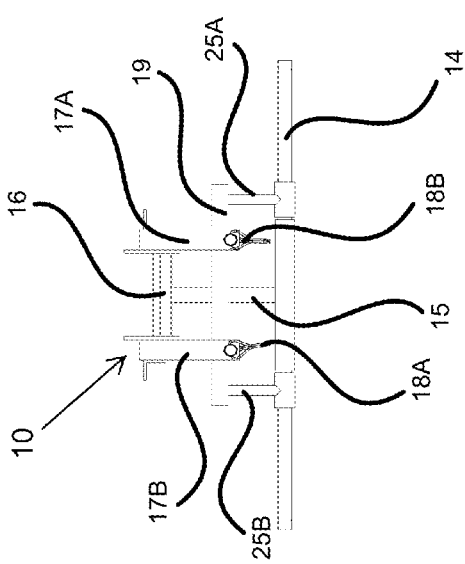

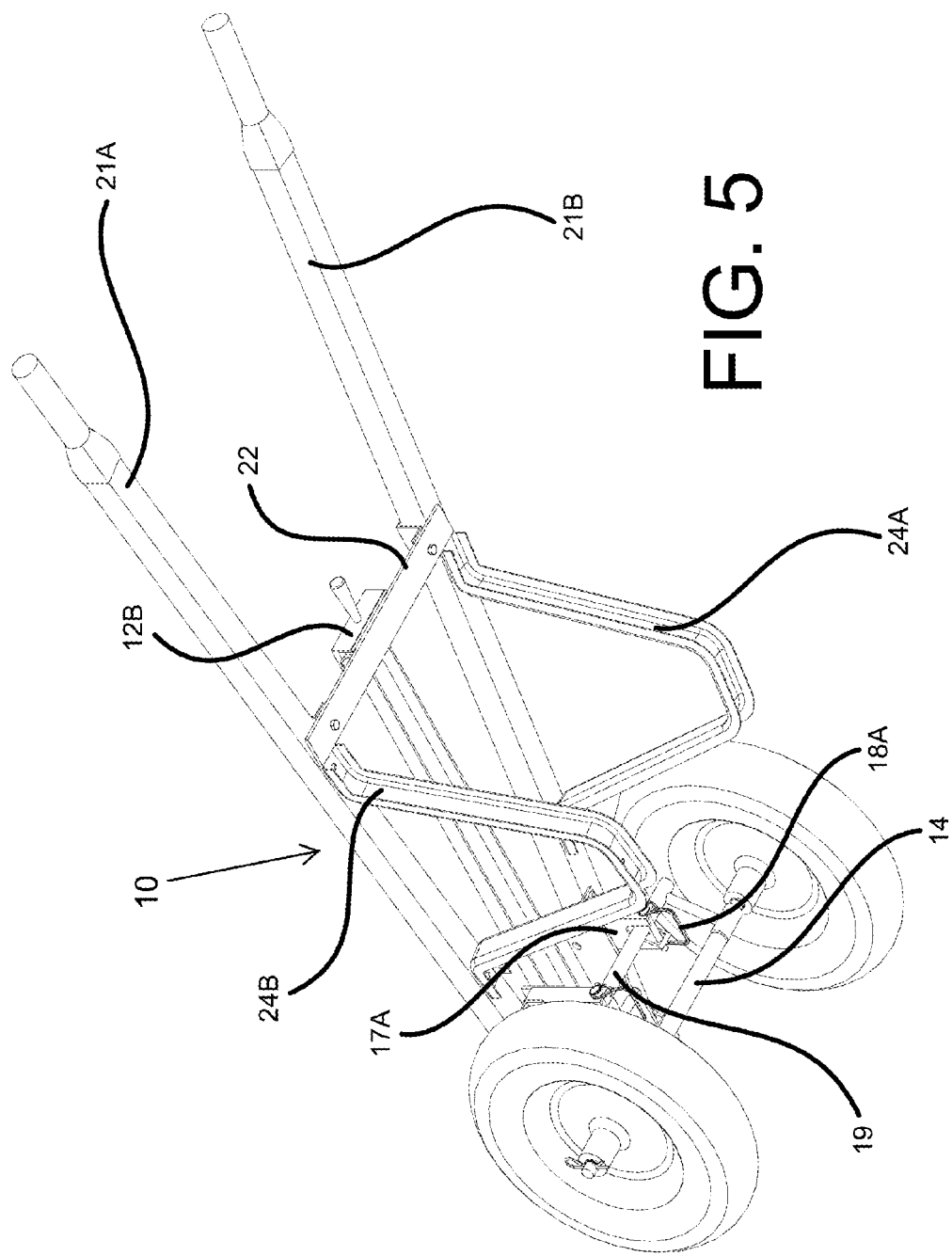

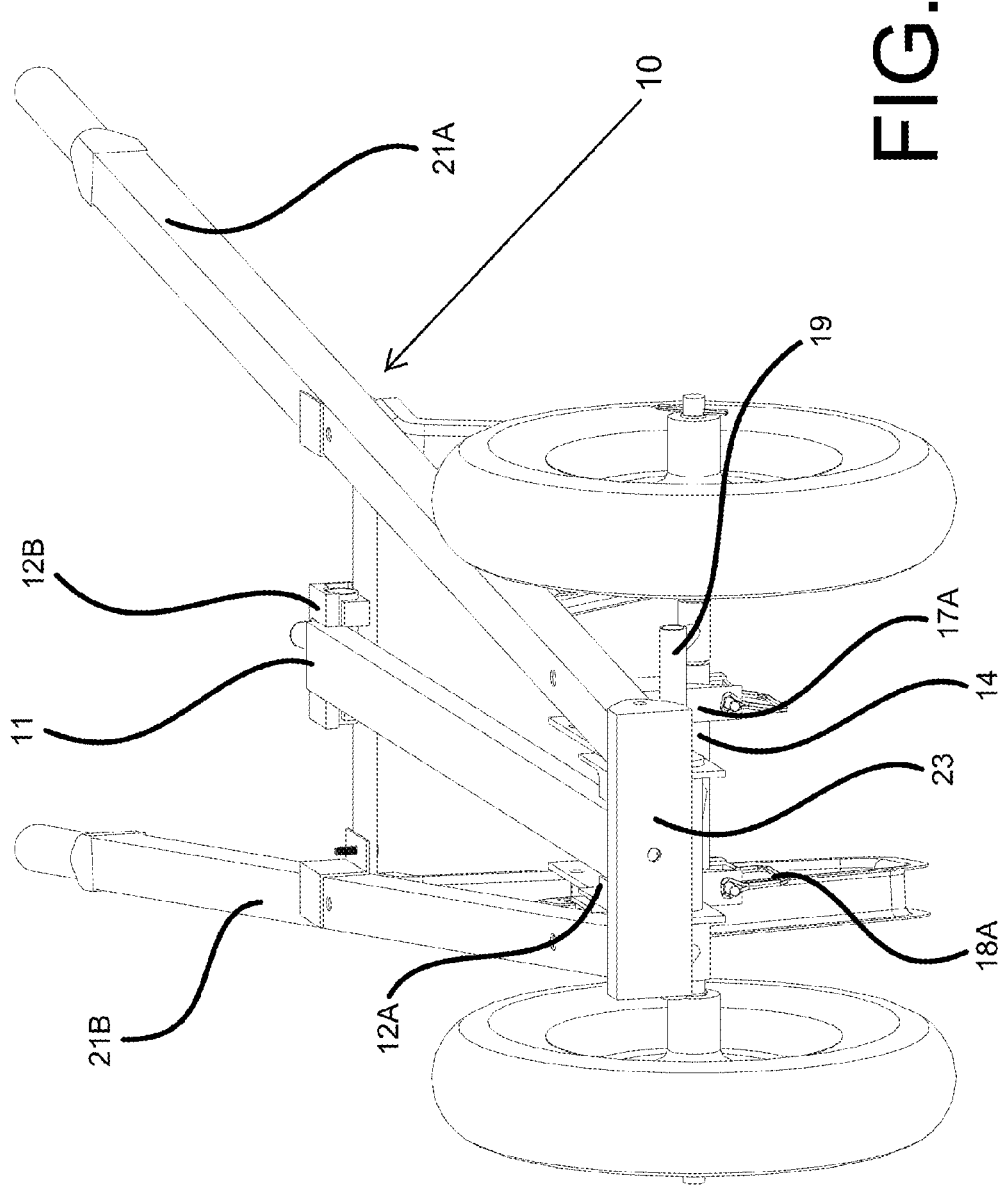

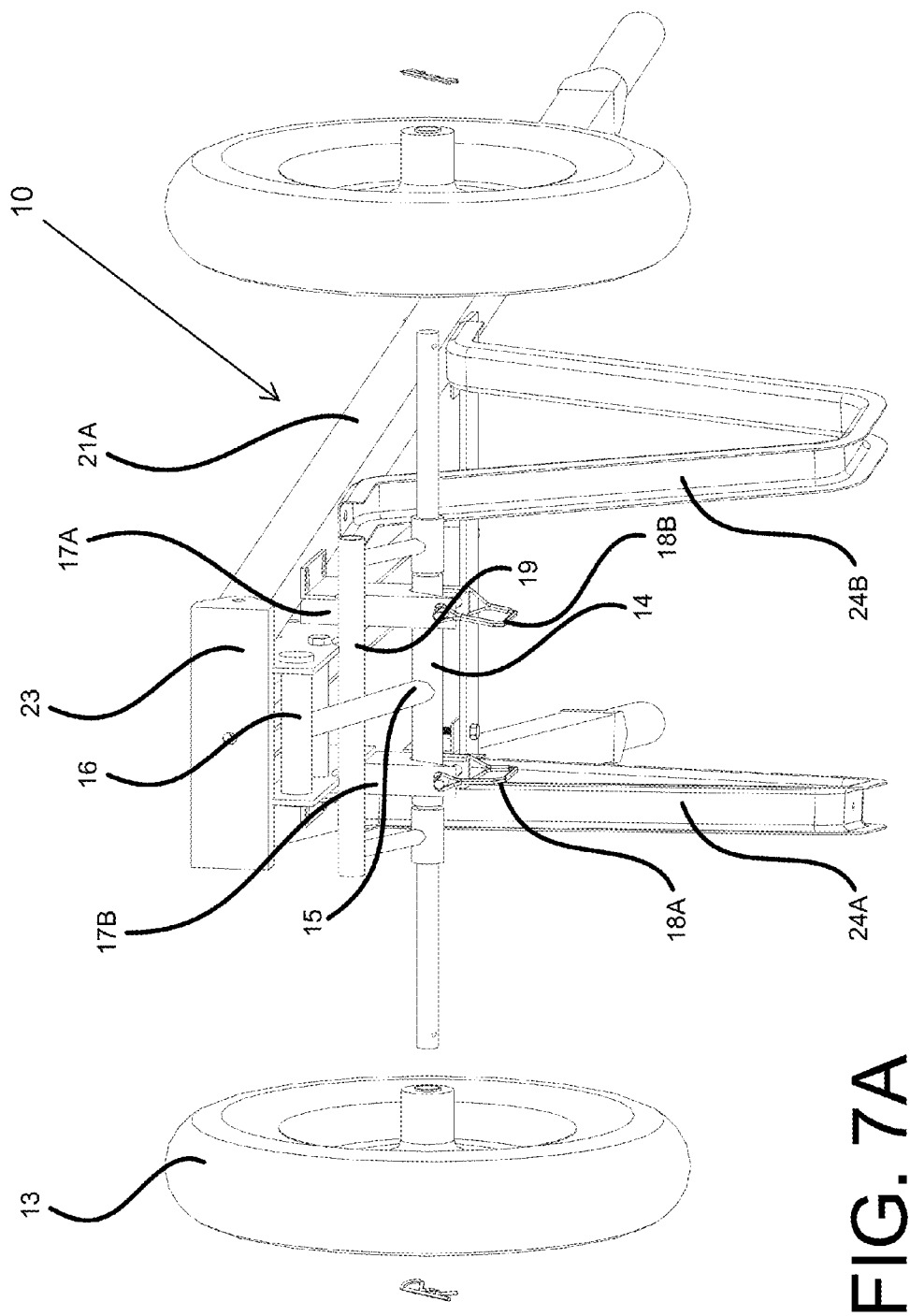

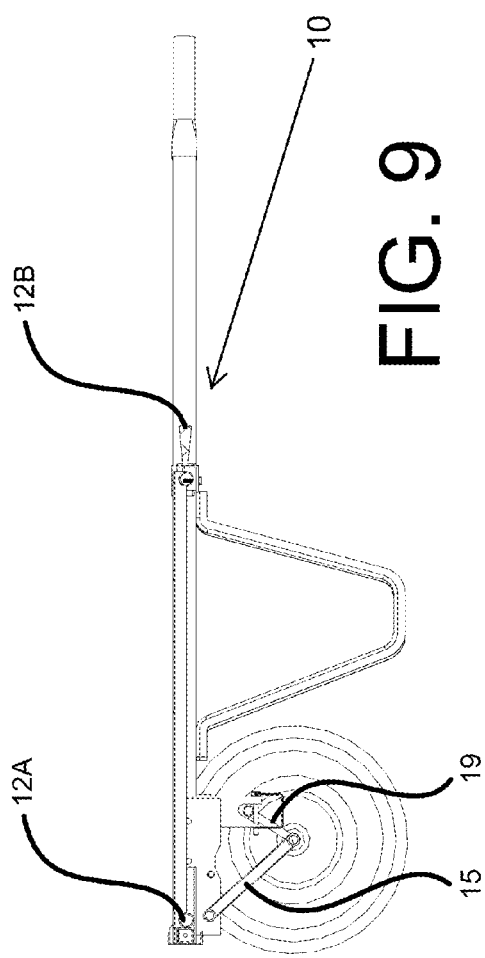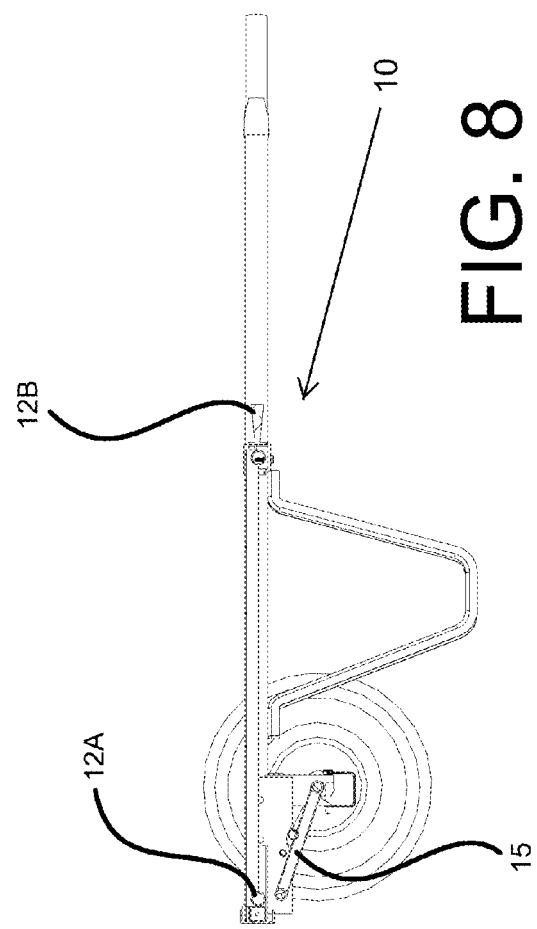

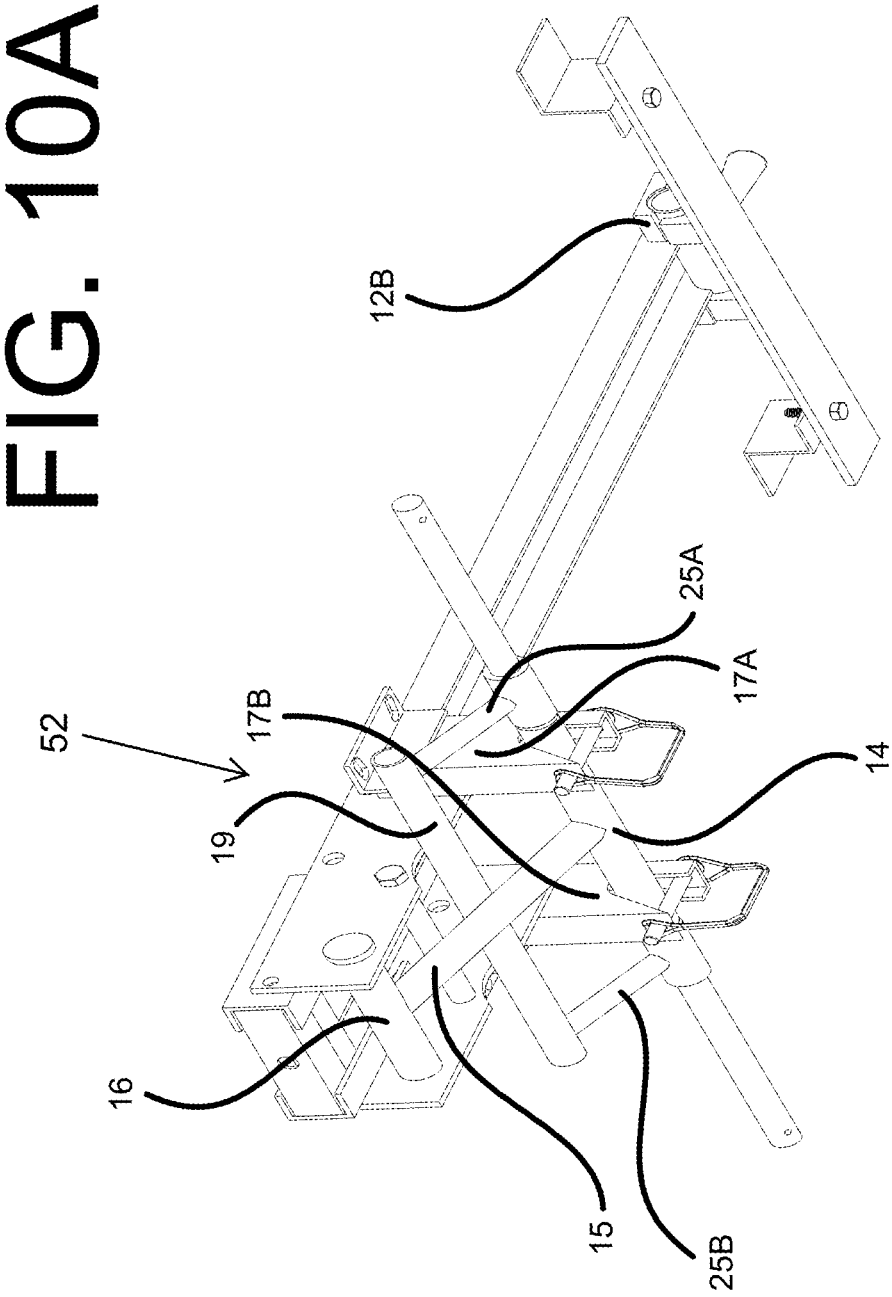

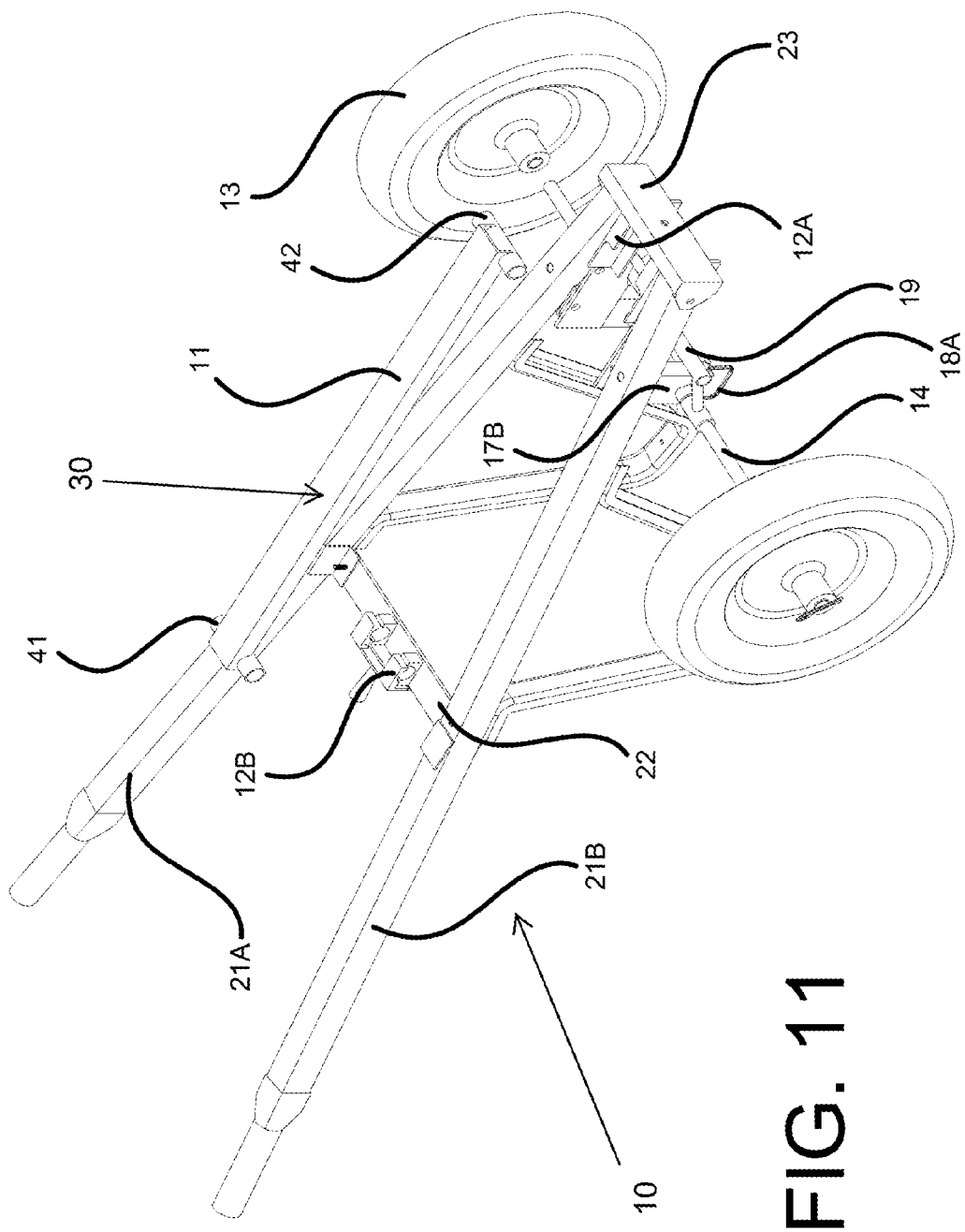

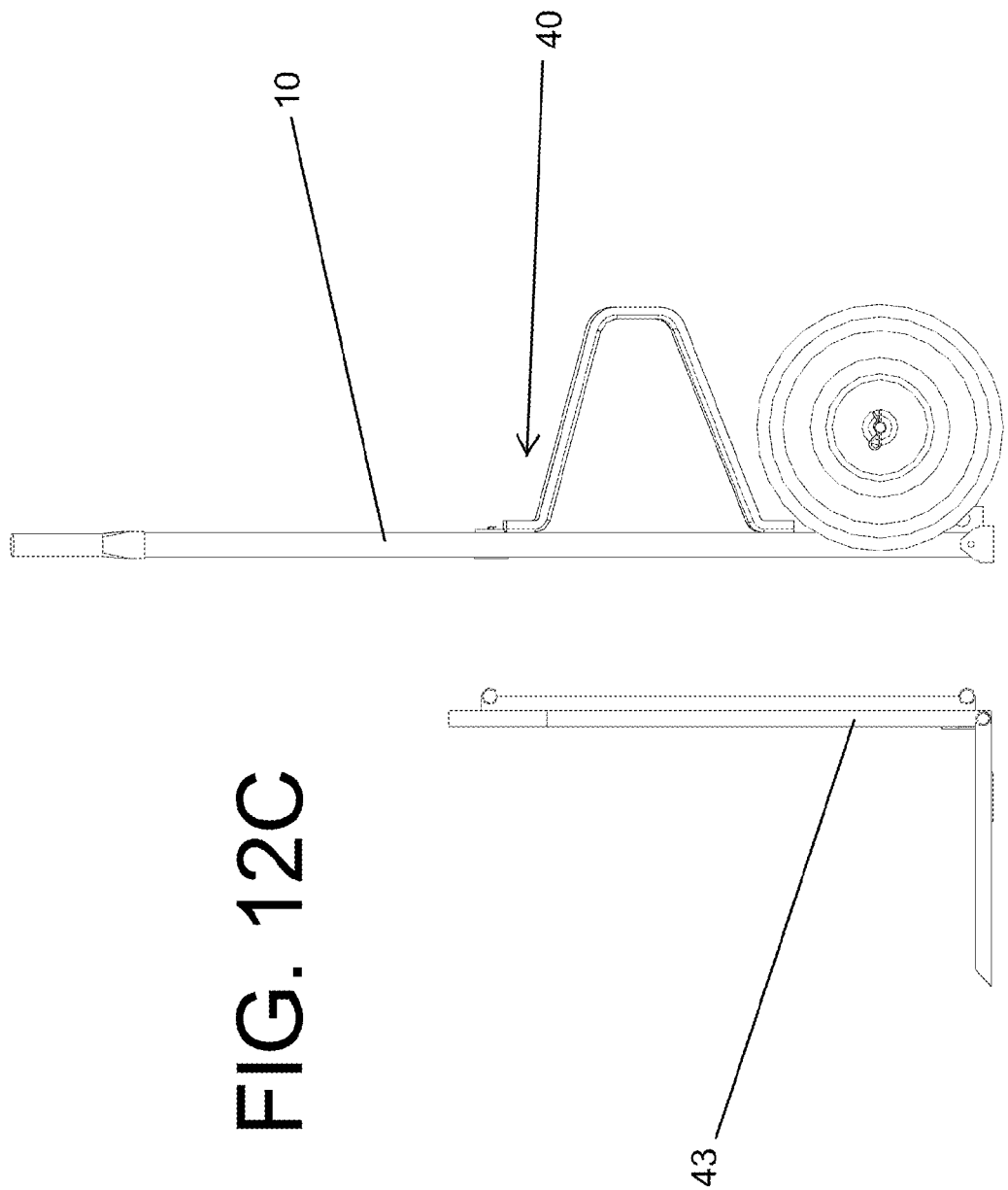

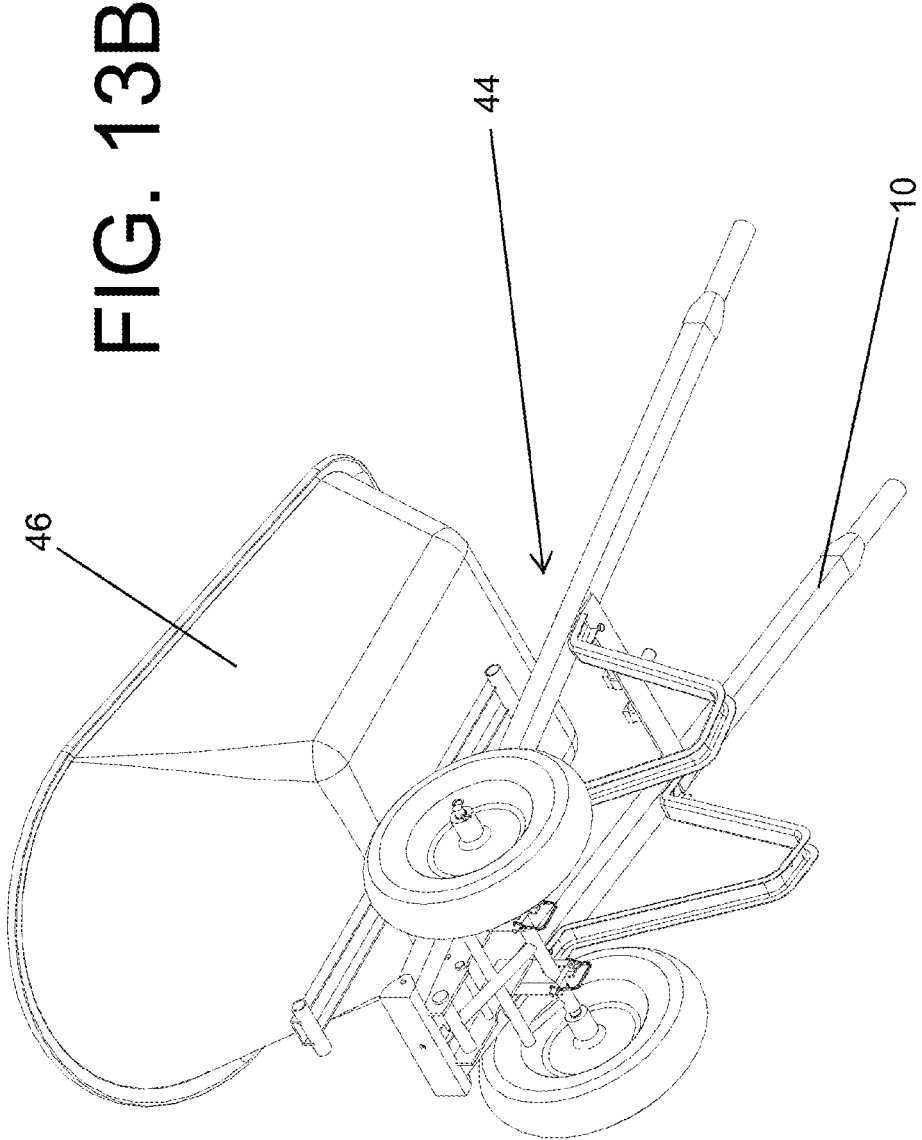

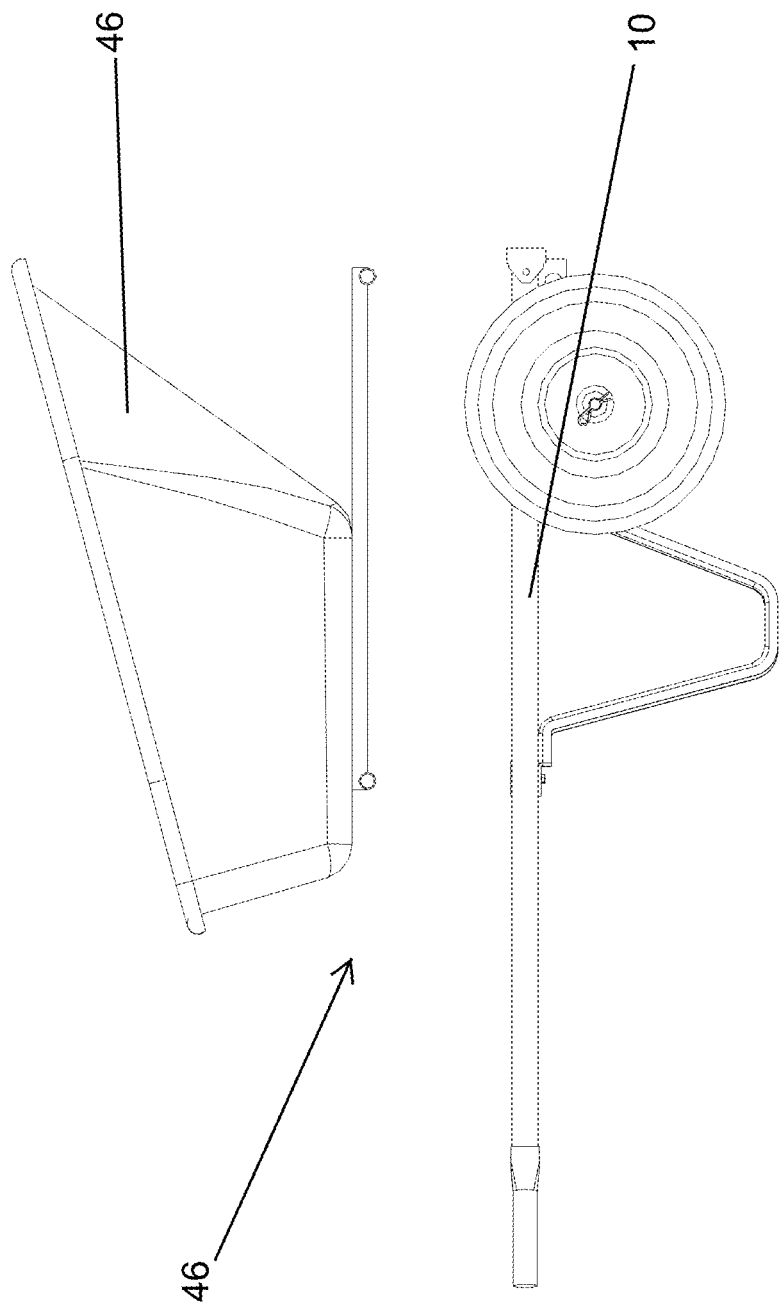

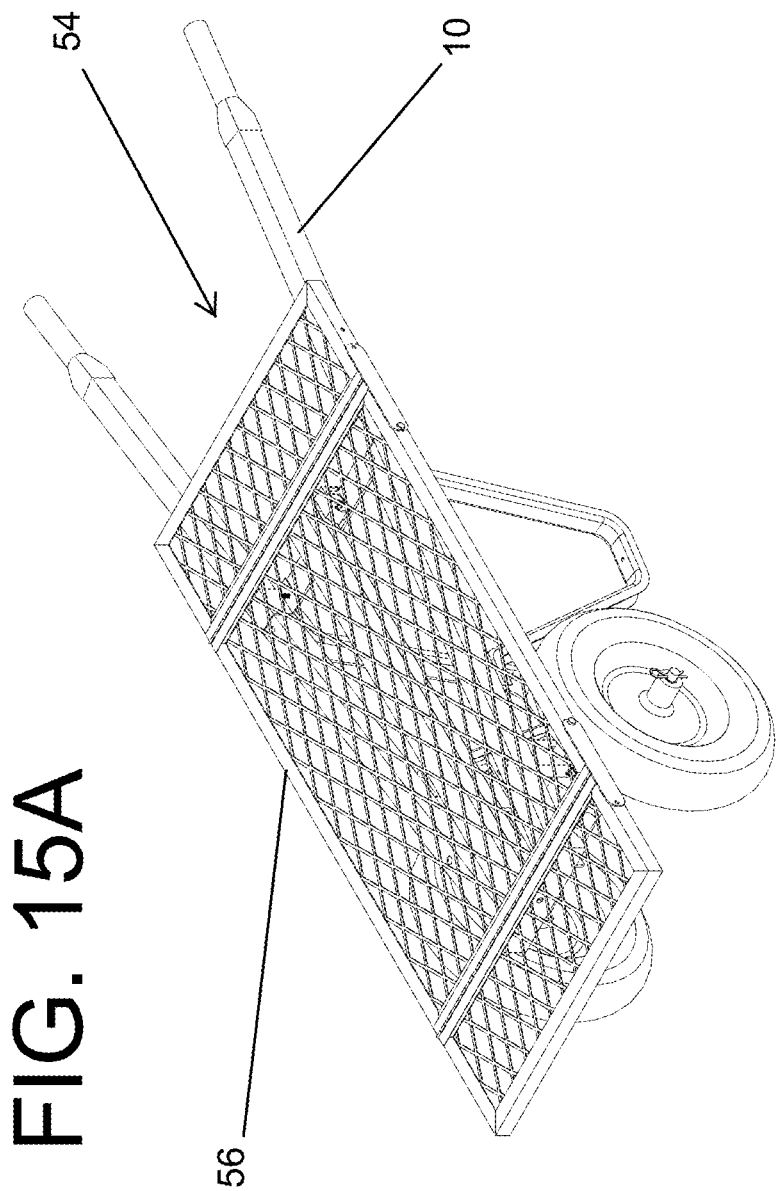

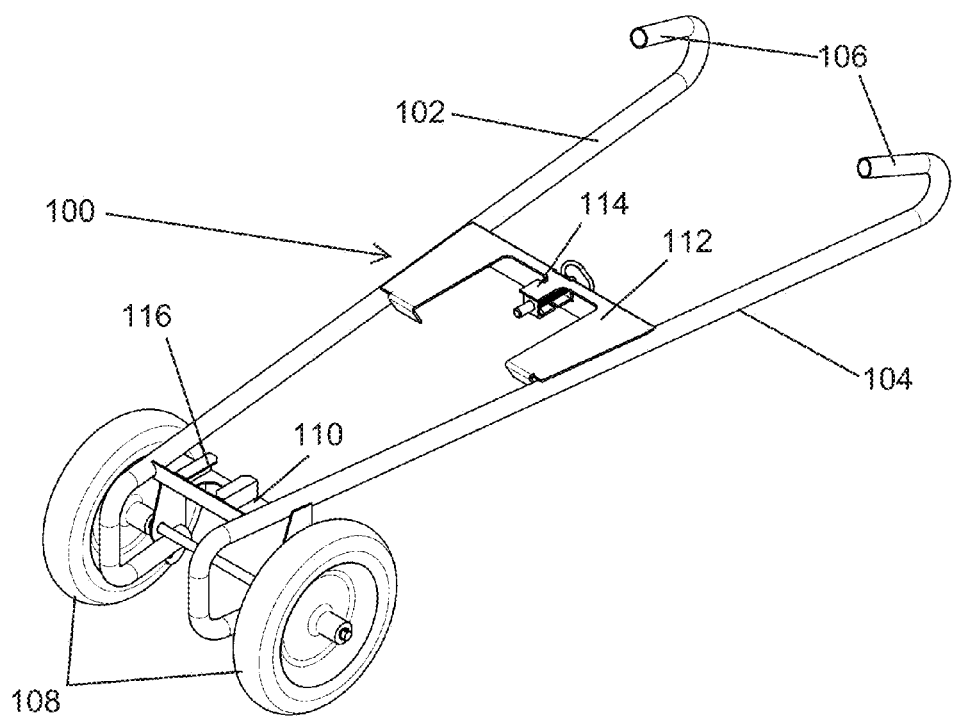

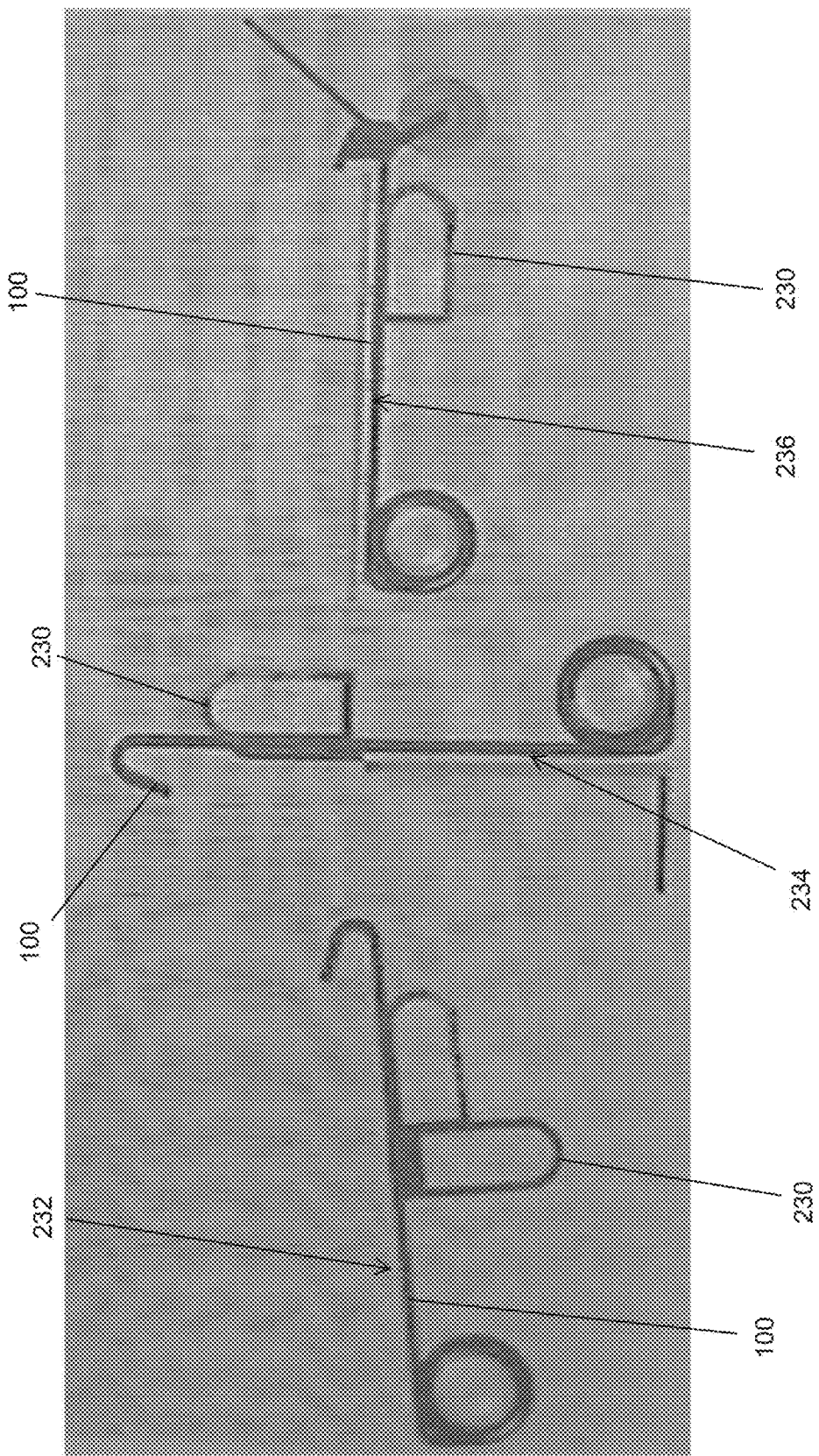

ADAPTIVE WHEELED CARRIER AND TRANSPORT DEVICE

CROSS-REFERENCE TO RELATED APPLICATION

The present application claims priority to earlier filed U.S. Provisional Application, Ser. No. 61/732,373, filed on Dec. 2, 2012, the disclosure of which is incorporated herein by reference in its entirety.

BACKGROUND

The present disclosure broadly relates to a device for hauling various objects. More specifically, the disclosure relates to a modified wheelbarrow configured to accommodate various carrying attachments and also adapted to two or more frame axle positions to facilitate hauling different objects either horizontally or vertically.

While a large number of wheelbarrow designs and styles are available and described in the art, the majority of the wheelbarrows comprise of: 1) a frame containing two handles, 2) a container placed on the frame for hauling various objects, 3) one or two front wheels used to rolling the wheelbarrow, and 4) two supports for balancing and stabilizing the wheelbarrow when resting on a surface. Also, generally, the frame and the wheel assembly are attached to one another in a permanent fashion.

Conventional devices are single purpose devices and are not adaptable to other uses, leaving users with a plurality of devices to maintain and store. Conventional devices are not adaptable to different weight or configuration of loads that a user may wish to carry. Conventional devices are not designed with human ergonomics in mind and many human interface elements are not optimal based on the human frame. Conventional devices tend to be designed to permit only pushing or pulling forms of movement and are not adapted to permit either form based on user needs or desires. Conventional devices are not adjustable as needed to take into account variable leverage requirements or desires based on load and user capability.

Improvements to existing conventional designs for wheeled carriers are desirable.

BRIEF DESCRIPTION OF THE DRAWINGS

The accompanying drawing figures, which are incorporated in and constitute a part of the description, illustrate several aspects of the present disclosure and together with the description, serve to explain the principles of the present disclosure. A brief description of the figures is as follows:

FIG. 2 is a front view of the axle positioning mechanism locked in the upper position according to an embodiment of the present disclosure.

FIG. 3 shows a front view of the carrier with positioning mechanism locked in the lower position.

FIG. 4 shows a front view of the carrier with positioning mechanism locked in the upper position.

FIG. 5 shows a bottom perspective view of the carrier with positioning mechanism locked in the upper position.

FIG. 6 illustrates a front perspective view of the carrier with positioning mechanism locked in the lower position.

FIG. 7A portrays a front perspective view of the carrier with positioning mechanism locked in the lower position showing it with the wheels removed.

FIG. 8 is a side view of the carrier with the positioning mechanism locked in the lower position.

FIG. 9 is a side view of the carrier with the positioning mechanism locked in the upper position.

FIG. 10A is a side perspective view of the carrier with the positioning mechanism locked in the lower position.

FIG. 11 shows an exploded top perspective view of the carrier with the positioning mechanism locked in the lower position.

FIGS. 12A-12C portray the carrier with a dolly attachment.

FIGS. 13A-13D portray the carrier with a container attachment.

FIGS. 15A-15B show the carrier with a yard cart attachment.

FIG. 16 is a perspective view of an alternative embodiment of a base frame of a wheeled carrier according to the present disclosure.

FIG. 47 is a side view of a second alternative embodiment of the base frame of FIG. 16 with a dual position rest mounted to the base frame, with the rest in a first position to assist in the use of the base frame with the removable wheel barrow tub, for example.

FIG. 48 is a side view of the base frame and rest of FIG. 47 with the rest in a second position, and a removable hand truck attachment mounted so that the wheeled carrier may be used as a hand truck.

FIG. 49 is a side view of the base frame and rest of FIG. 47 with the rest in the second position and a removable garden cart attachment mounted so that the wheeled carrier may be used as a garden cart.

DETAILED DESCRIPTION

Reference will now be made in detail to exemplary aspects of the present disclosure which are illustrated in the accompanying drawings. Wherever possible, the same reference numbers will be used throughout the drawings to refer to the same or like parts. The following detailed description is of the best currently contemplated modes of carrying out exemplary embodiments of the disclosure. The description is not to be taken in a limiting sense, but is made merely for the purpose of illustrating the general principles of the disclosure.

The wheeled carrier configuration of a first embodiment of the present disclosure may be obtained from a wheelbarrow comprising two wheels by enhancing the two wheel design to broaden its payload types and capacities a well as enhance the configurations for using these payloads. The conversion from a wheelbarrow having a single wheel to the carrier of the present invention is also within the scope of the present disclosure. Some unique features of a first exemplary embodiment of the present disclosure may be:

1. The frame and axle positions can adjust to allow for a horizontal or a vertical payload carrying configurations.
2. An axle positioning mechanism is provided to lock the frame in at least two positions: an upper position with the wheels forward and a lower position with the wheels rearward. The upper position is one where the frame is substantially parallel with the ground. The front side of the frame is lowered relative to the wheels. The length differential of between about 2" to about 8" fall within the scope of the present disclosure. This mechanism enables a number of additional uses for the carrier such as a dolly and various cart-bodies.
3. A yoke carrier attachment and support structure that serves as a platform for placing accessories and alternate carriers such that they are interchangeable. The front and rear yoke receiving structure is configured for easy removal and installation of these accessories.

A first embodiment of a wheeled carrier frame 10 according to the present disclosure is described in FIGS. 1-15.

The carrier frame 10 may be comprised of handles 21A and 21B, cross bar member 22, front bumper 23, and floor balancers 24A and 24B. In most wheelbarrows, the frame is attached to the wheel assembly and is not free to move independently of the wheel assembly. The frame in the carrier of the present disclosure is modified to allow it to move a predetermined distance relative to the wheels 13.

Figure 1:
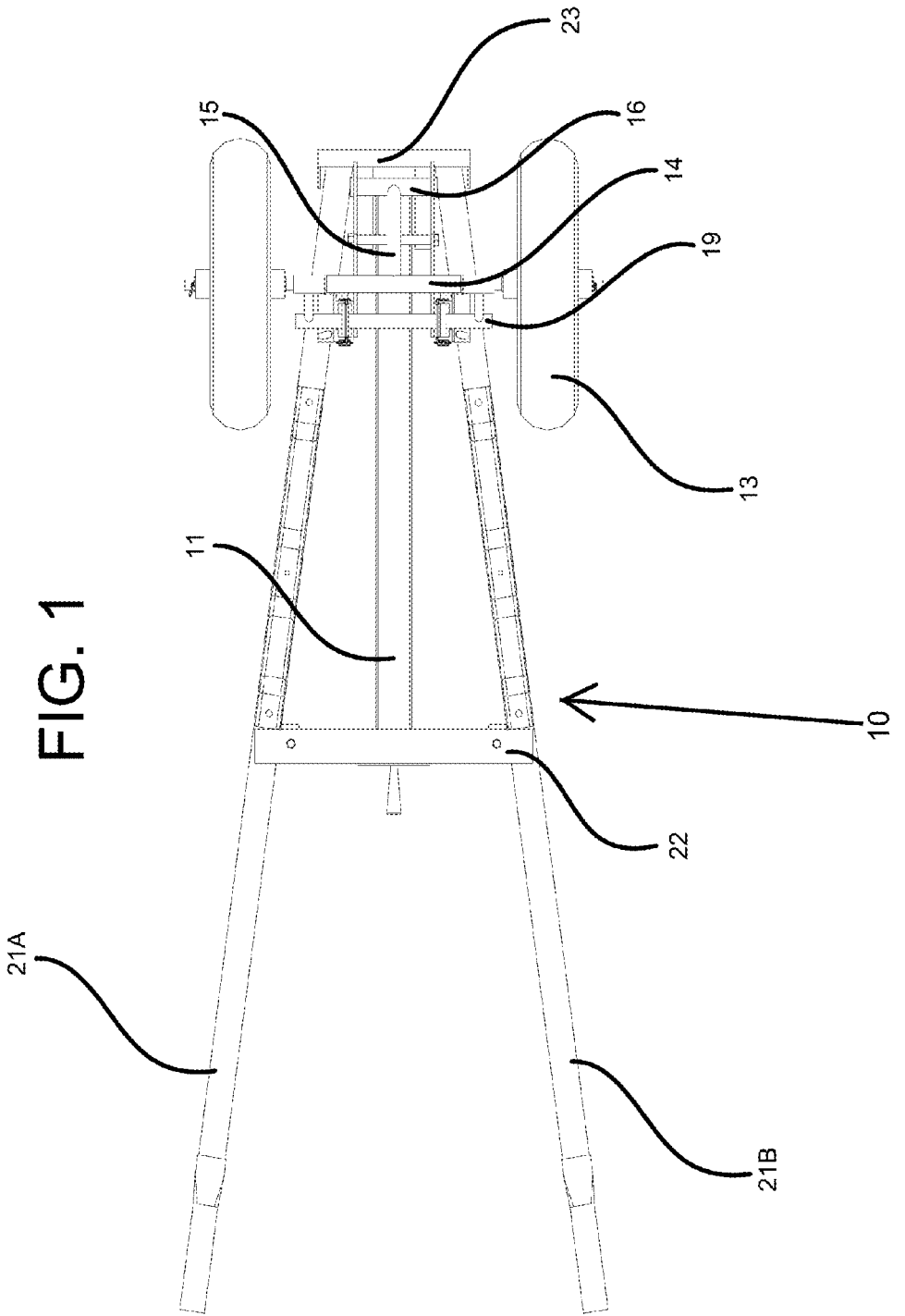
FIG. 1 is a bottom view the carrier showing the positioning mechanism locked in the upper position according to an embodiment of the present disclosure.
Figure 7B:
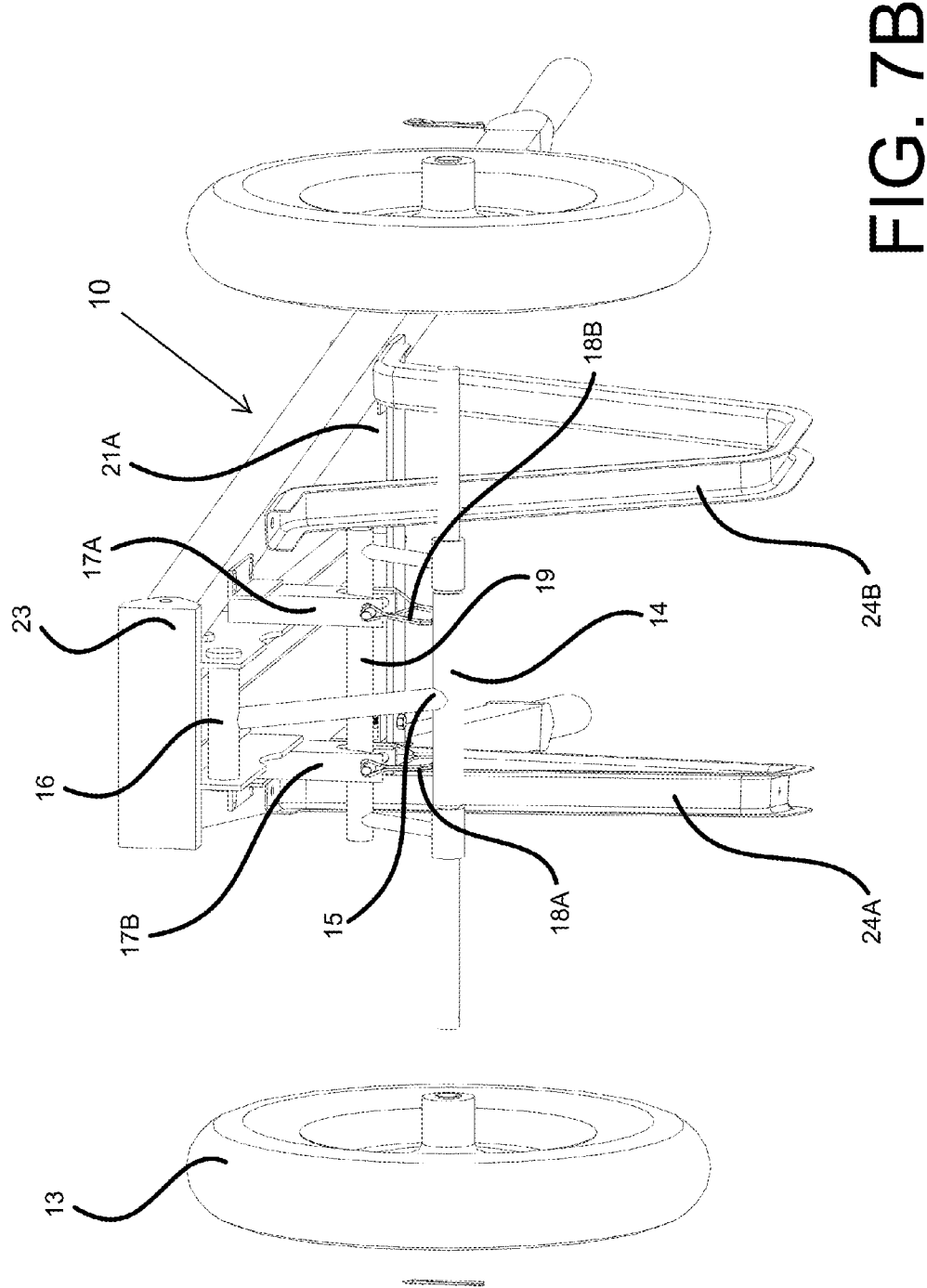
FIG. 7B portrays a front perspective view of the carrier with positioning mechanism locked in the upper position showing it with the wheels removed.
Figure 10B:
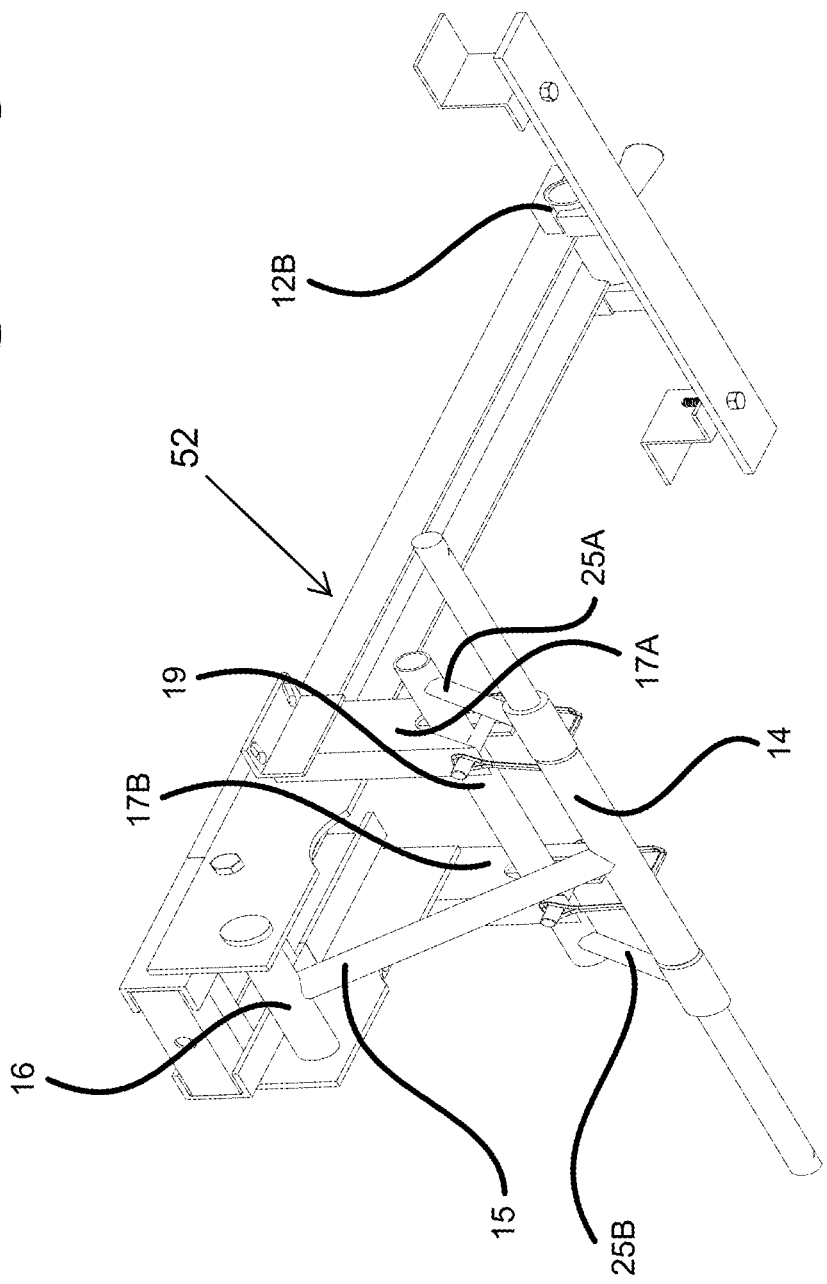
FIG. 10B is a side perspective view of the carrier with the positioning mechanism locked in the upper position.

A positioning mechanism 52 may be comprised of a position extender bar 19 attached to axle 14 through parallel connecting bars 25A and 25B. The attachment allows the axle position extender bar 19 to pivot around the wheel axle 14. An axle pivot T-bar 15 supports the wheel axle 14 between the parallel connecting bars 25A and 25B. The T-bar 15 ends with a cross bar 16 placed below the front side of the frame. Two axle support brackets 17A and 17B are configured to clamp onto either the wheel axle 14 or the axle position extender bar 19. With the axle support brackets 17A and 17B clamped onto the wheel axle 14, the front part of the frame resides in the lower position. To bring the front part of the frame to the upper position, one would pivot the position extender 19 upward and insert it into the axle support brackets 17A and 17B. Clamps 18A and 18B secure the position extender 19 in the axle support brackets 17B and 17A respectively. Pivoting the position extender 19 upward and inserting it into the axle support brackets 17A and 17B forces the frame to move upward which in turn readjusts the positions of the pivot T-bar 15 and cross bar 16 that support the frame. In order to set the frame in the lower position, the clamps 18A and 18B are unfastened and the frame is raised sufficiently to free up position extender 19 to pivot into a location above the axle pivot T-bar 15 as shown in FIGS. 7A and 10A. The support brackets 17A and 17B would move lower to clamp onto the wheel axle 14.

The present disclosure further contains an elongated yoke bar 30 that has an elongated bar 11 and two end bars 41 and 42 as shown in FIG. 11 that are perpendicular to the elongated bar 11. Yoke bar 30 may serve as the support base for attaching the various accessories such as a yard cart and a dolly that may be placed interchangeably onto the yoke bar. Yoke bar 30 may be held in place at its front end by the front axle positioning receiver 12A attached to the front bumper 23 and held at its back end by rear locking cross member 12B. Yoke bar 30 may be supported by the front axle positioning receiver 12A and locked in place by the rear locking cross member 12B.

Figure 12A:
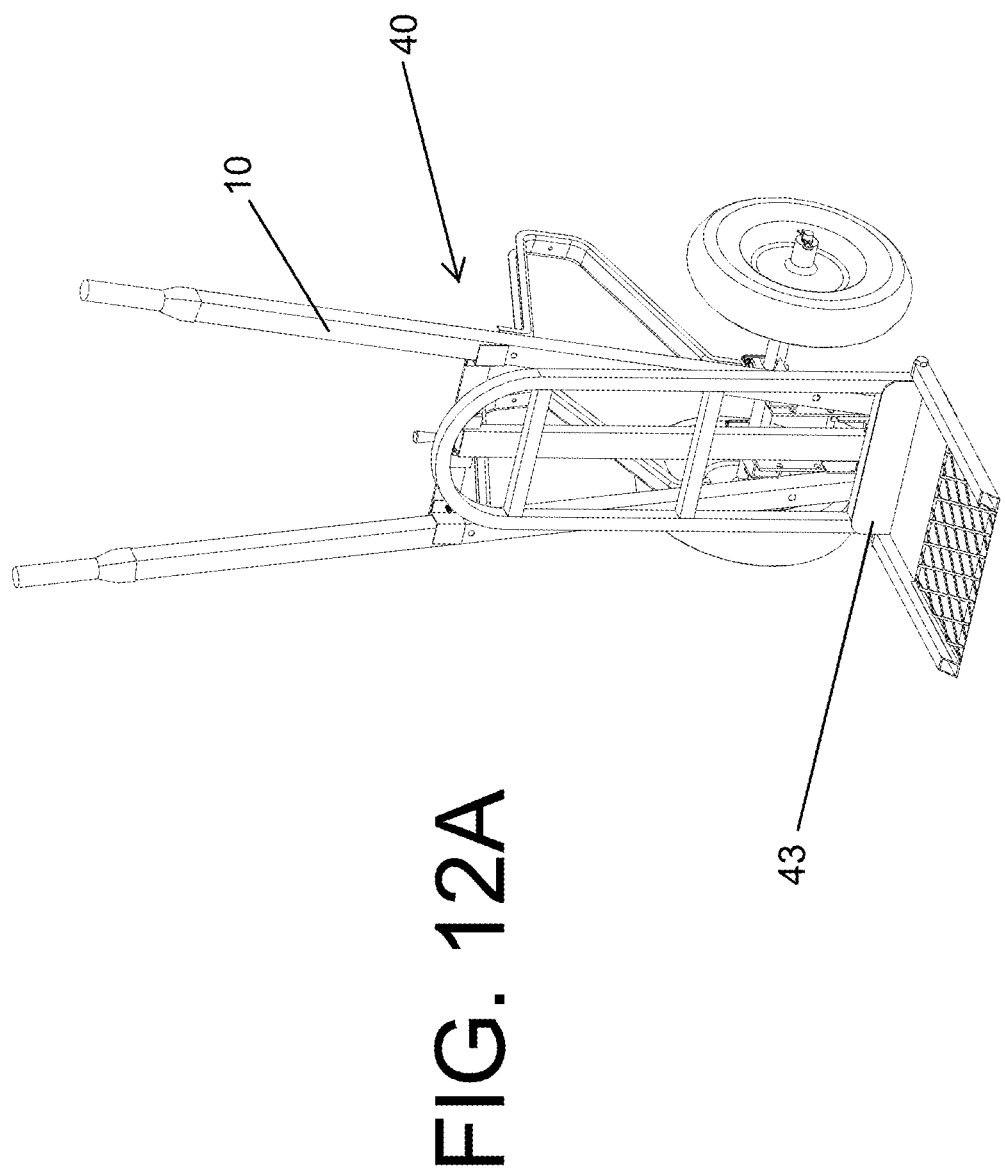
Figure 12B:
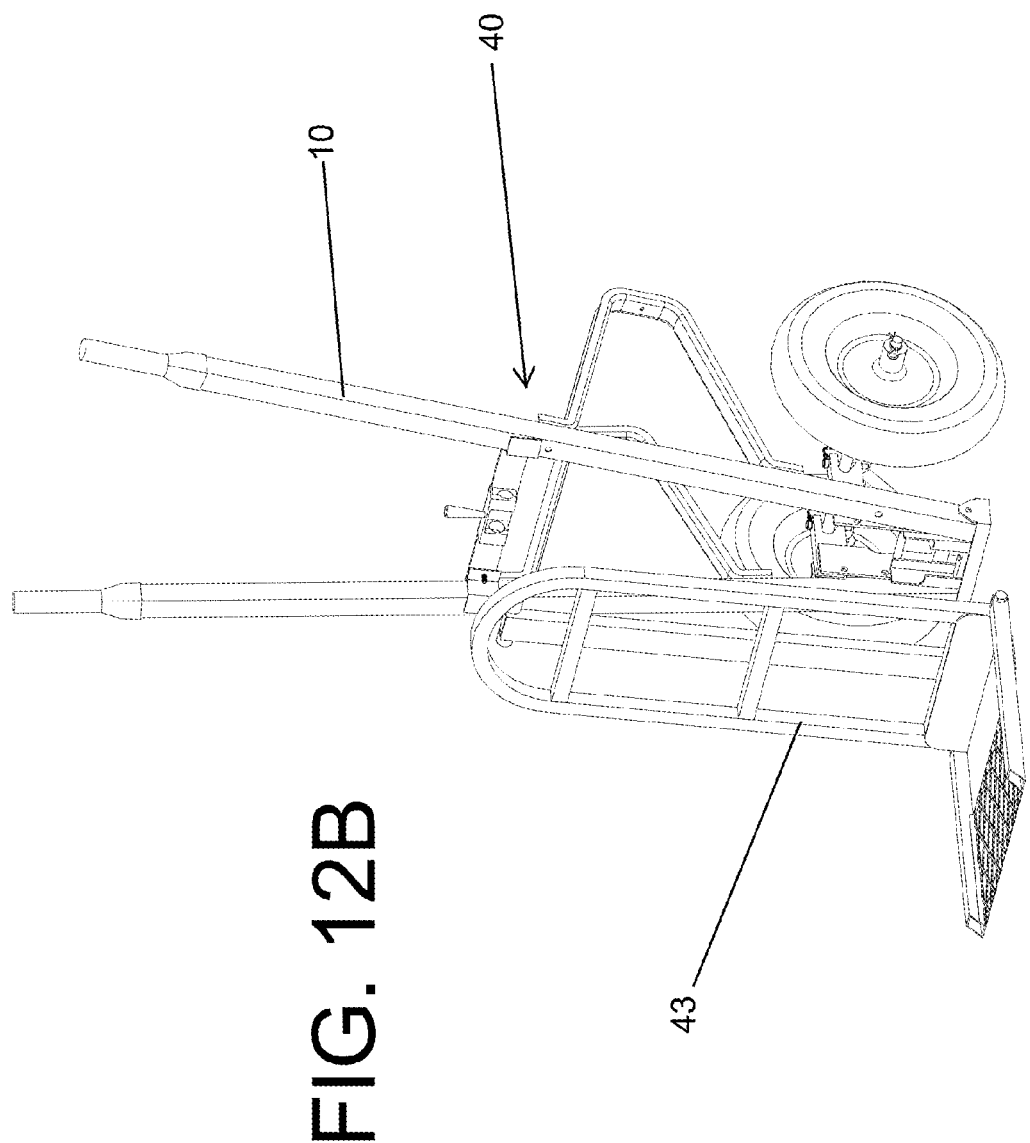
Figure 13A:
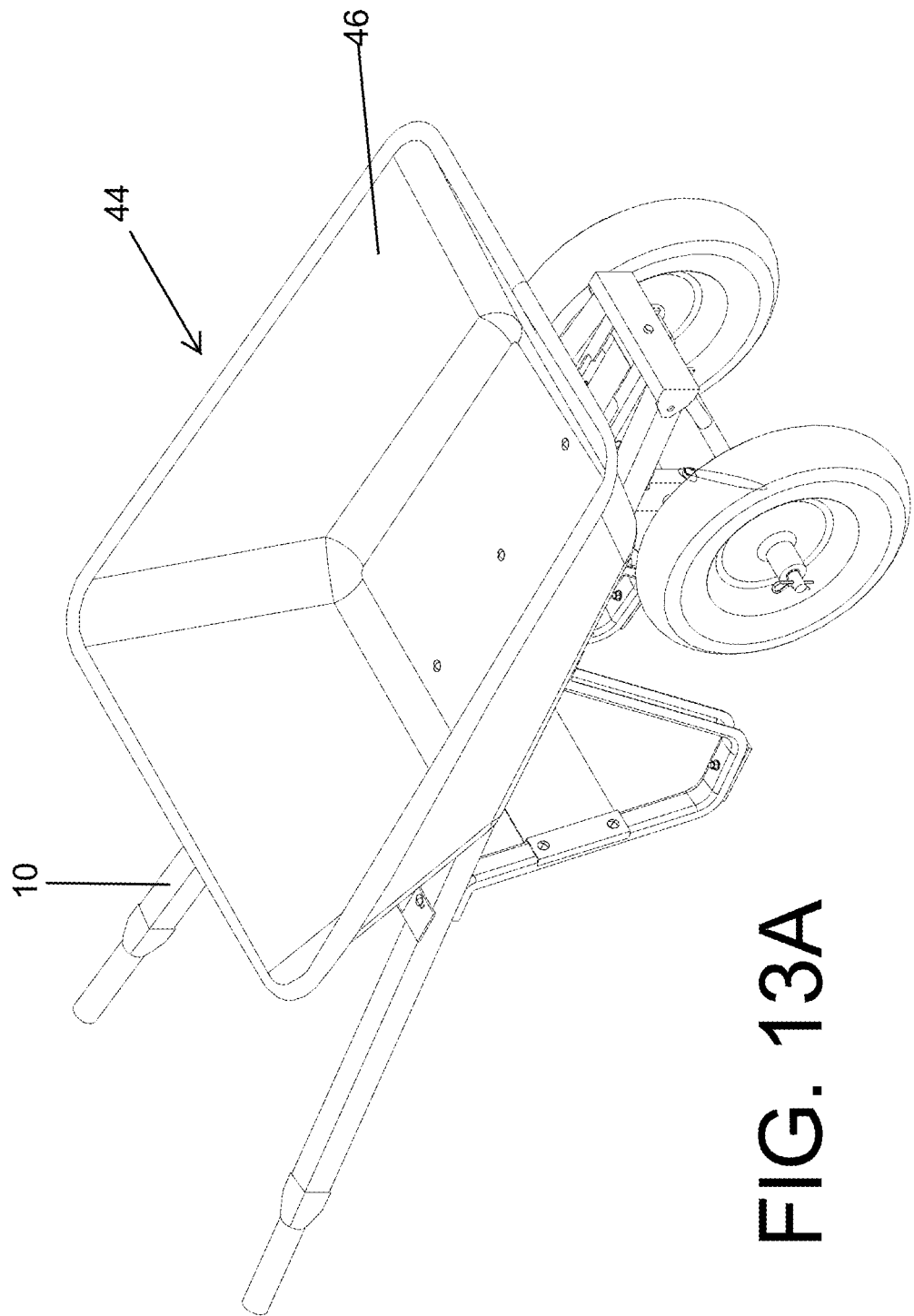
Figure 13D:
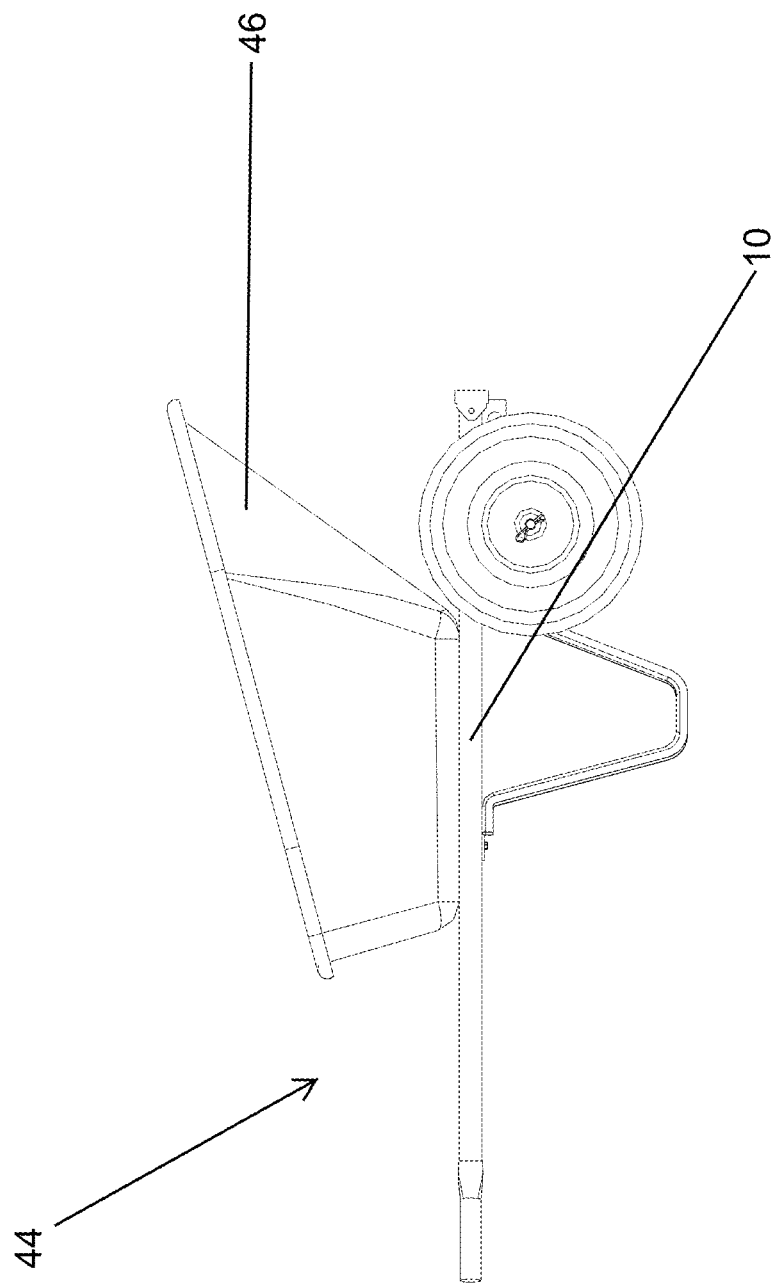
Figure 14A:
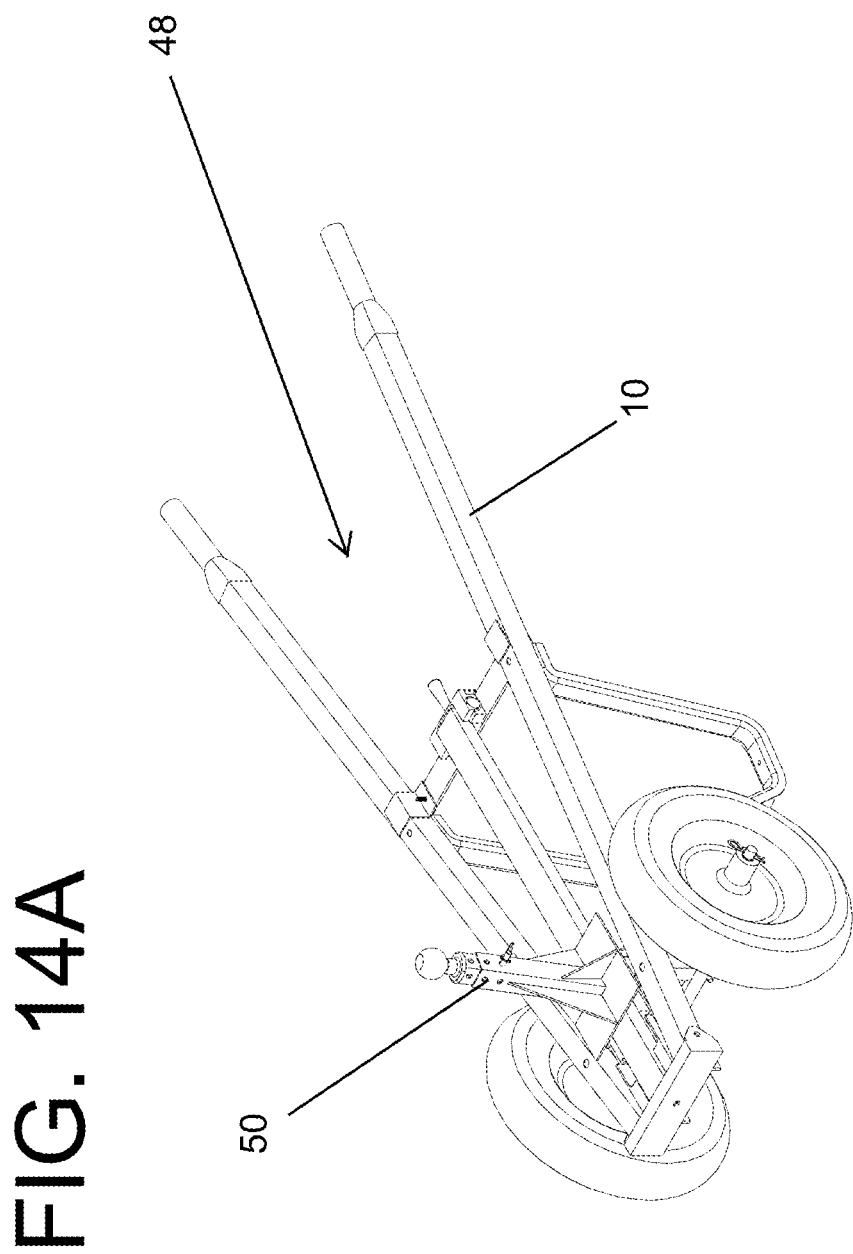
FIGS. 14A-14B illustrate the carrier with a trailer dolly attachment.
Figure 14B:
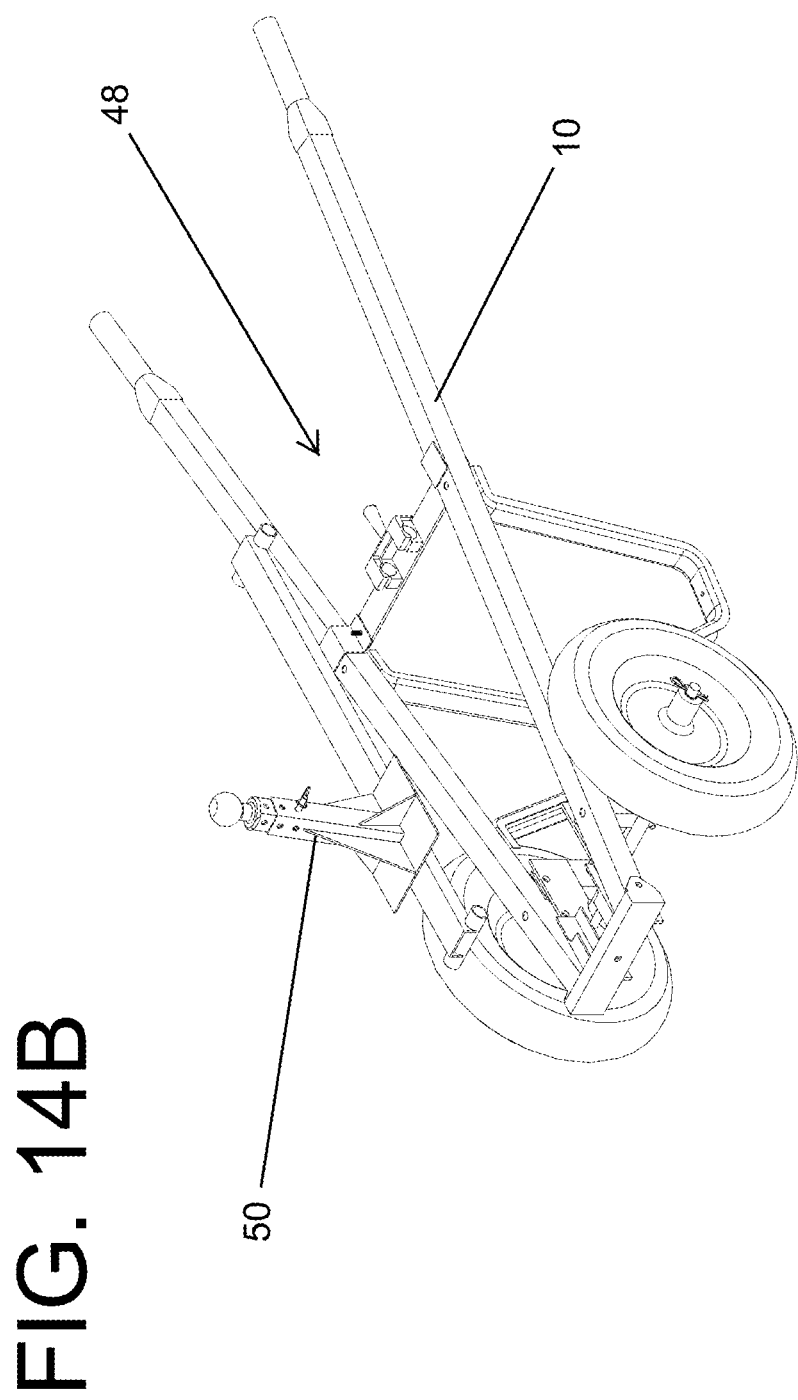
Figure 15B:
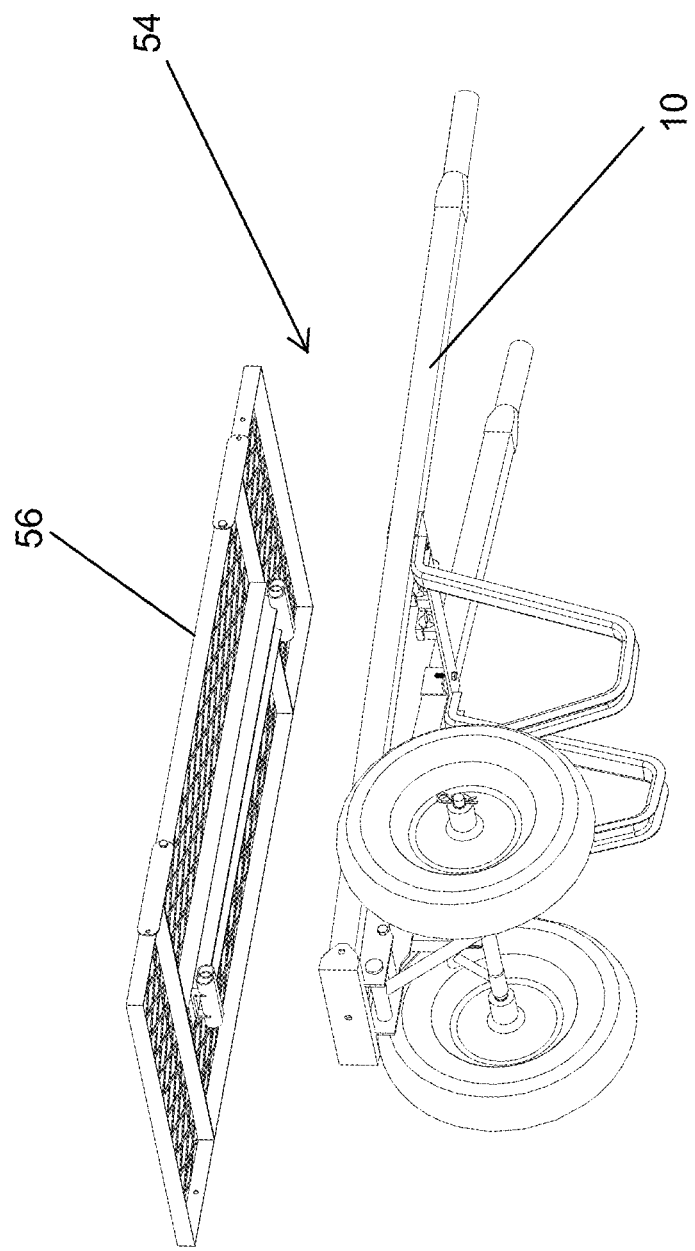

The front assembly and rear cross member may serve as the basis for the assembly of a wheel barrow into a truss structure thereby allowing positioning attaching bodies across a rigid assembled framework. Various accessories may be attached to the elongated portion of the yoke bar. The yoke bar is removable from the structure thus allowing easy interchangeability of the accessories as needed. FIGS. 12A-12C show a removable dolly attachment 43 and carrier frame 10 combining to form a hand truck 40. FIGS. 13A-13D portray a removable container attachment 46 and carrier frame 10 combining to form a wheel barrow 44. FIGS. 14A-14B illustrate a removable trailer dolly attachment 50 and carrier frame 10 combining to form a trailer mover 48. FIGS. 15A-15B show a removable yard cart attachment 56 combining with carrier frame 10 to form a yard cart 54. In each case yoke bar with the attached respective accessory is shown separated from the support structure as well as in an installed configuration.

Referring now to FIGS. 16 to 20, a second embodiment of a base or carrier frame 100 according to the present disclosure may include frame rails 102 and 104 with upturned handles 106 at a rear end. At a front end of each frame rail may be mounted one or more wheels 108 with a mounting bracket 110 extending between the frame rails and providing a mounting location for the wheels. Preferable, the front end of the rails will be turned down as shown in the FIGS. to permit the location of the wheels sufficiently low to permit the mounting of removable attachments to the frame rails above the wheels.

A second mounting bracket 112 may be mounted between the frame rails at an intermediate location between the front and rear ends to hold the frame rails at the desired relationship to each other. Mounting bracket 112 may also include a spring loaded pin assembly 114 or some other suitable releasable mechanism to engage a variety of removable attachments for base frame 100. Bracket 110 may also include a receiver 116 to releasably engage such removable attachments as well. It is anticipated that a variety of known release mechanism may be incorporated into the present disclosure and it is not the intent of the present disclosure to limit the nature of the releasable engagement of the various attachments described herein and the base frame.

Figure 17:
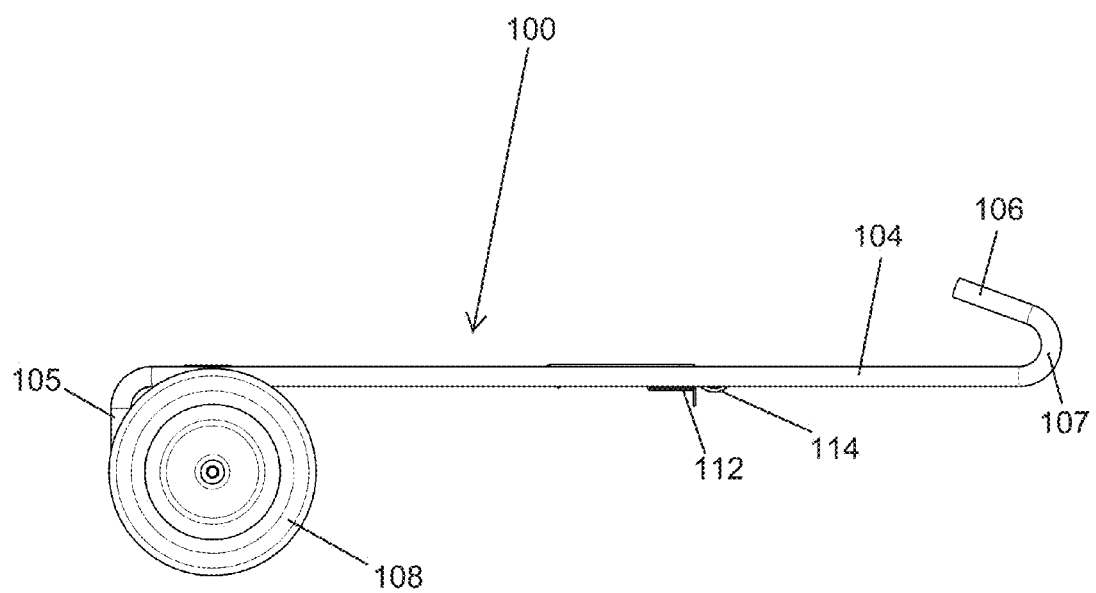
FIG. 17 is a side view of the base frame of FIG. 16.

Referring now to FIG. 17, a front end 105 of frame rail 104 may be preferably configured so that wheel 108 may contact and roll along a surface whether base frame 100 is positioned horizontally or vertically. Further, front end 105 is preferably configured so that frame rail 104 extends slightly above wheel 108 so that any load placed on top of frame rail 104 will not come into contact with or engage wheel 108. Handles 106 may be preferably turned back at rear end 107 of frame rail 104 so that the angle of the handle is at an angle selected to reduce stress and improve leverage and downhill control on a user of the base frame (and any connected attachments). Such a configuration may allow a variety of hand positions based on the load being carried and nature of the attachments mounted to the base frame.

Figure 18:
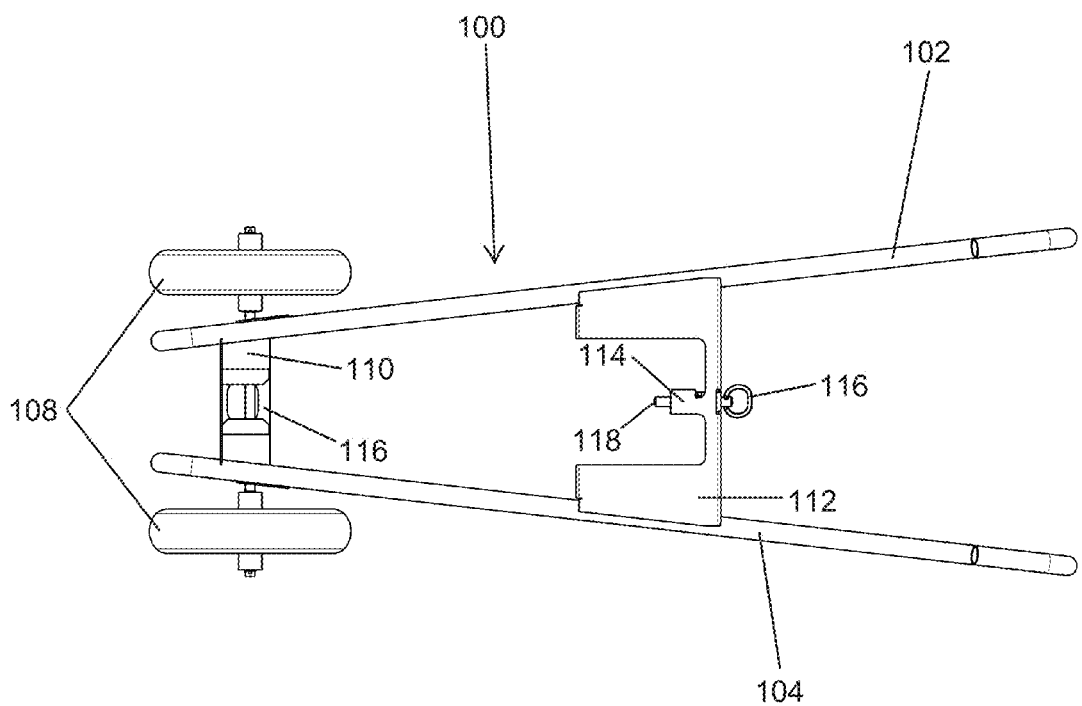
FIG. 18 is a top view of the base frame of FIG. 16.

Referring now to FIG. 18, releasable mechanism assembly 114 of mounting bracket 112 may include a moveable pin 118 that selectively engages or disengages a removable attachment. A handle 116 may permit a user of the base frame to actuate the engagement or disengagement of such attachments.

Figure 19:
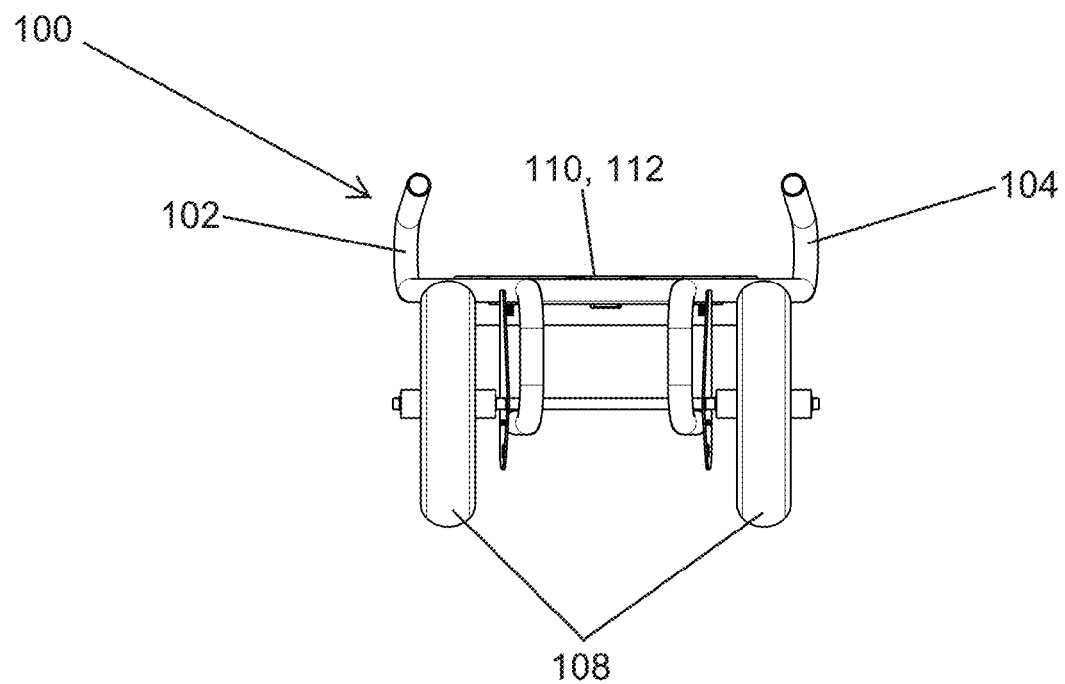
FIG. 19 is a front view of the base frame of FIG. 16.
Figure 20:
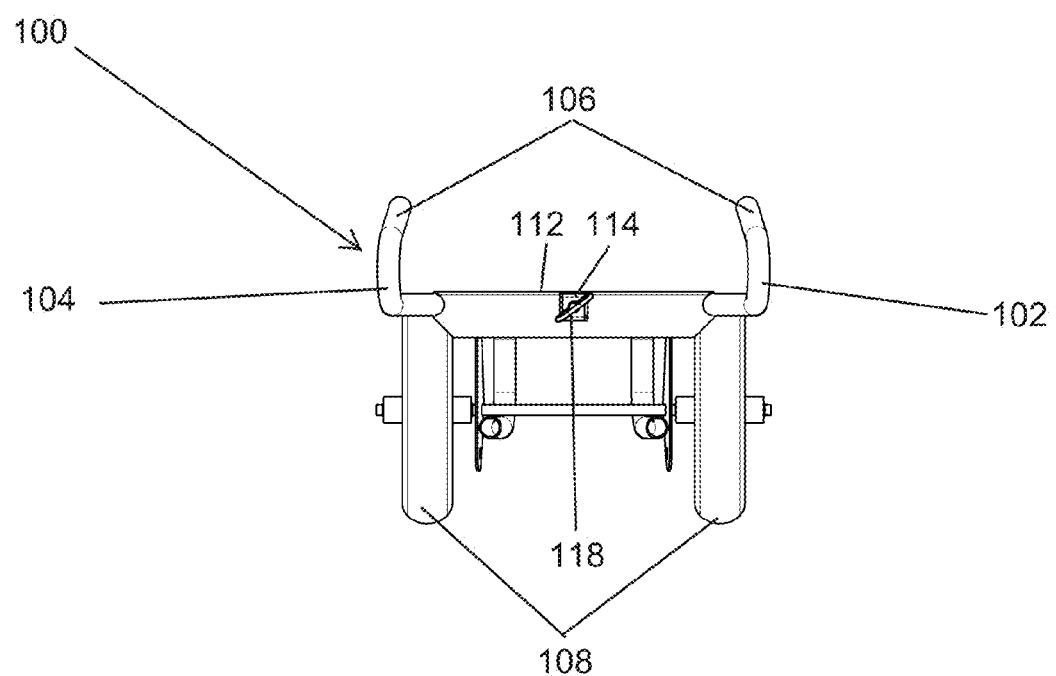
FIG. 20 is a back view of the base frame of FIG. 16.
Figure 21:
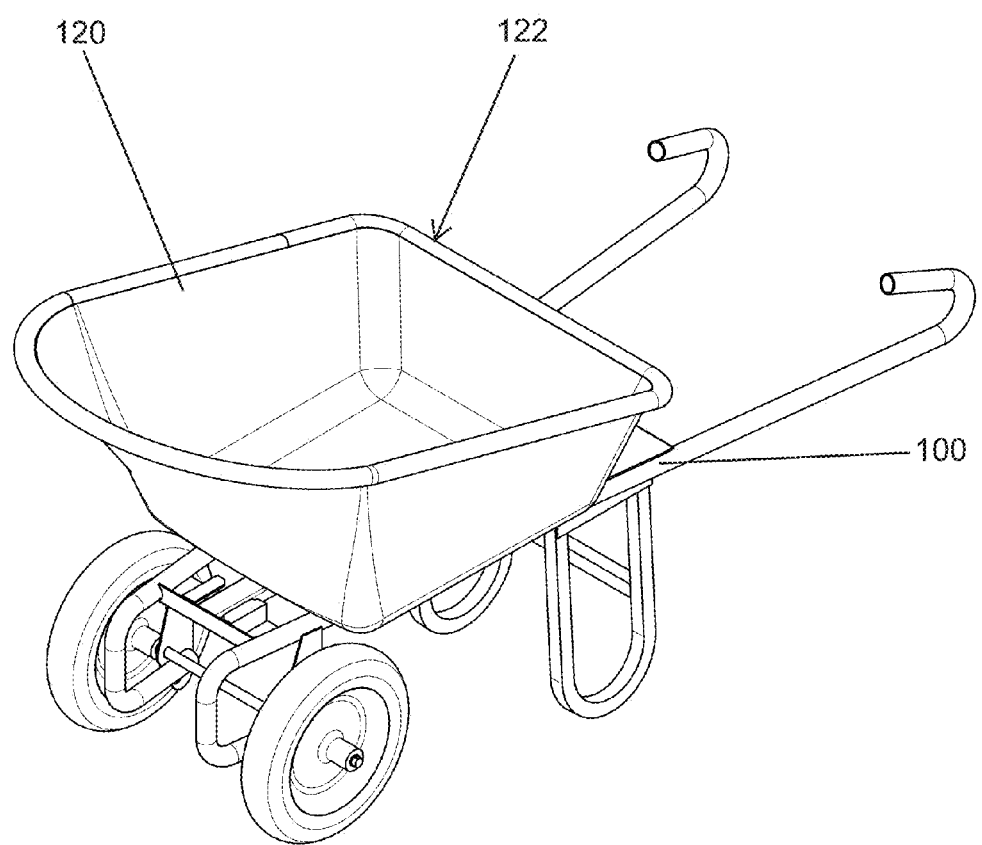
FIG. 21 is a perspective view of an alternative embodiment of a removable wheel barrow tub according to the present disclosure mounted to the base frame of FIG. 16.
Figure 22:
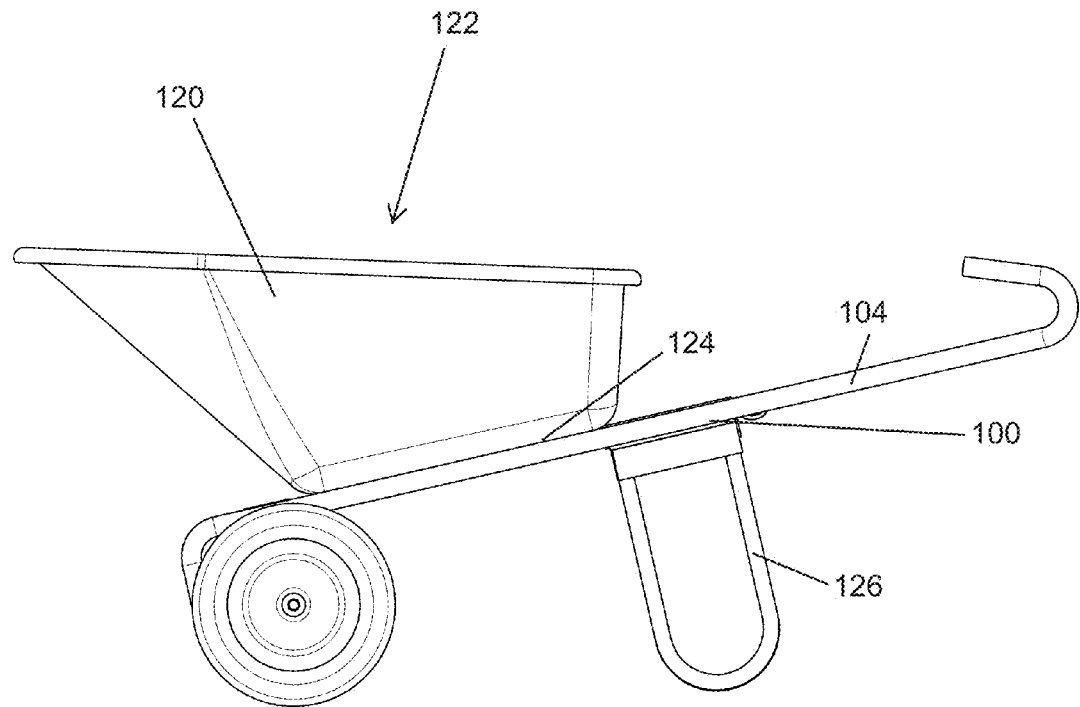
FIG. 22 is a side view of the removable wheel barrow tub and base frame of FIG. 21.
Figure 23:
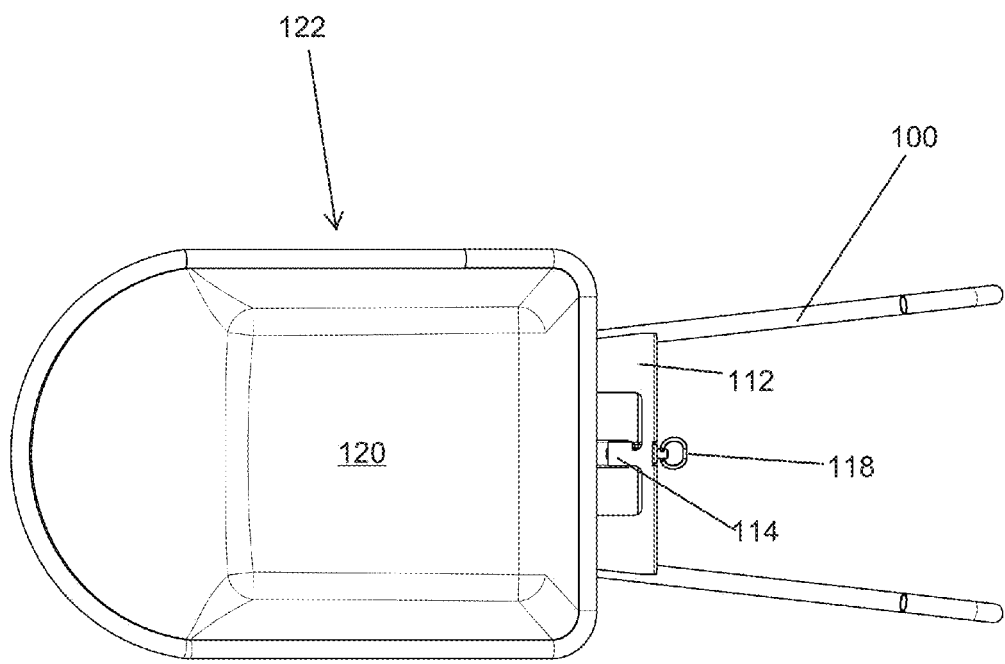
FIG. 23 is a top view of the removable wheel barrow tub and base frame of FIG. 21.

Referring now to FIG. 19, it is more clearly shown that the upper most edge of wheels 108 does not extend above the top of either frame rail 102 or 104 and that brackets 110 and 112 define a surface on which attachments may rest. Since the wheels do not extend above the tops of the frame rails, attachment may be configured to rest on the frame rails for additional support without interfering with the movement of wheels 108 or being damaged by movement of wheels 108.

Referring now to FIGS. 21 to 25, base frame 100 is shown with a removable wheel barrow tub attachment 120 releasably mounted to the base frame to form a wheel barrow 122. As can be seen on FIG. 22, tub attachment 120 may positioned above wheels 108 without interfering with the rolling movement of wheels 108. A bottom edge of tub attachment 120 is shown as resting on top of frame rail 104 to provide additional structural support to tub attachment 120 to withstand loads placed within tub attachment 120. This configuration may permit tub attachment 120 to be made from a lighter gage of steel or thickness of plastic (or any other suitable material that may be used to construct tub attachment 120). The positioning of wheels 108 beneath tub 120, the amount of effort needed to lift handles 106 when wheel barrow 122 is loaded may be reduced due to improvements in leverage and such positioning may aid in the ability of the user to control movement of the wheel barrow more effectively.

A removable rest 126 (or a pivoting rest as illustrated in FIGS. 47, 48 and 49) may preferably be mounted underneath bracket 112 so that handles 106 may be elevated above the ground. This elevation of the handles may naturally reduce the height to which a user may need to raise the base frame to move wheel barrow 122. Rest 126 may be adapted to raise the handles to different heights based on the nature of the tub or other attachment that may be placed on the frame rails. Rest 126 may be removably attached to base frame 100 be engaging release mechanism 114 or may be mounted with a separate mechanism or releasable arrangement.

Figure 24:
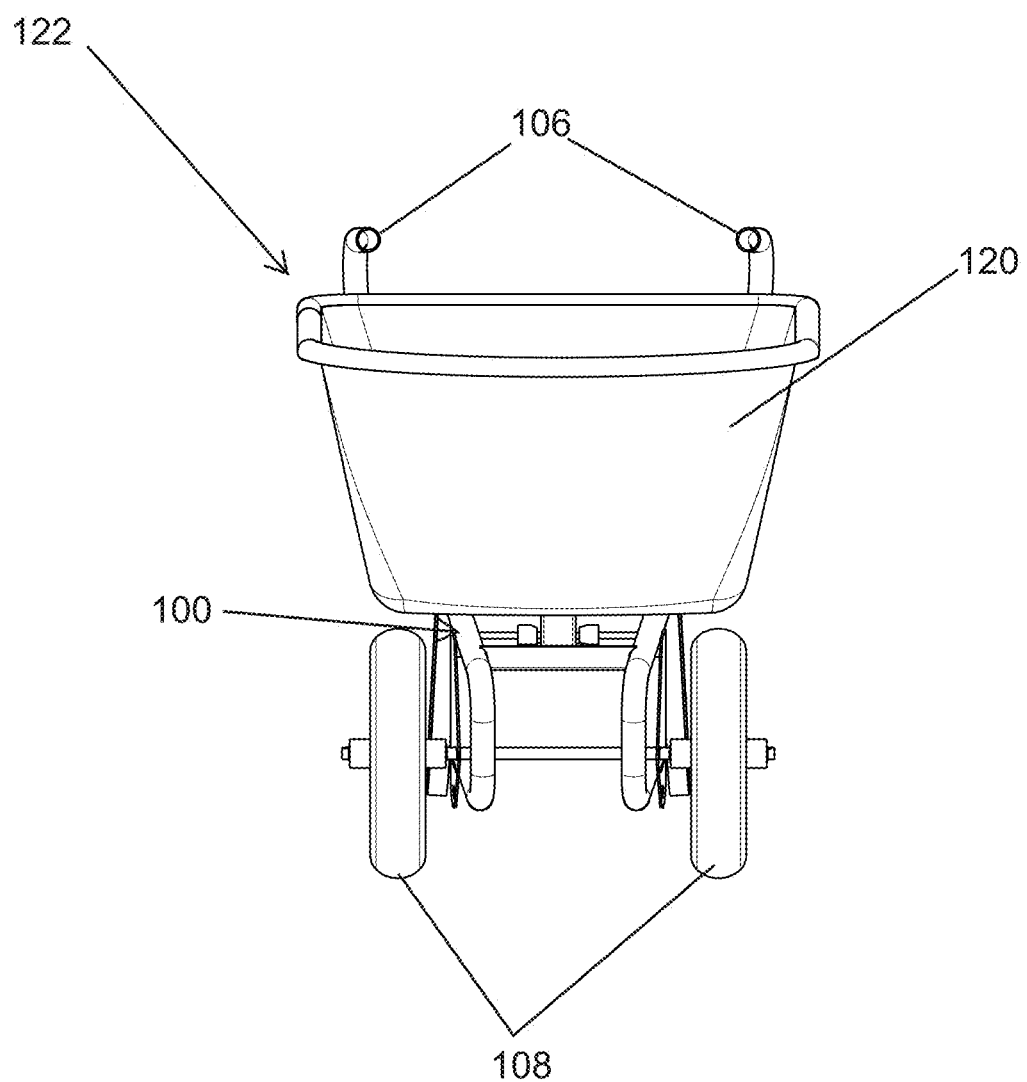
FIG. 24 is a front view of the removable wheel barrow tub and base frame of FIG. 21.
Figure 25:
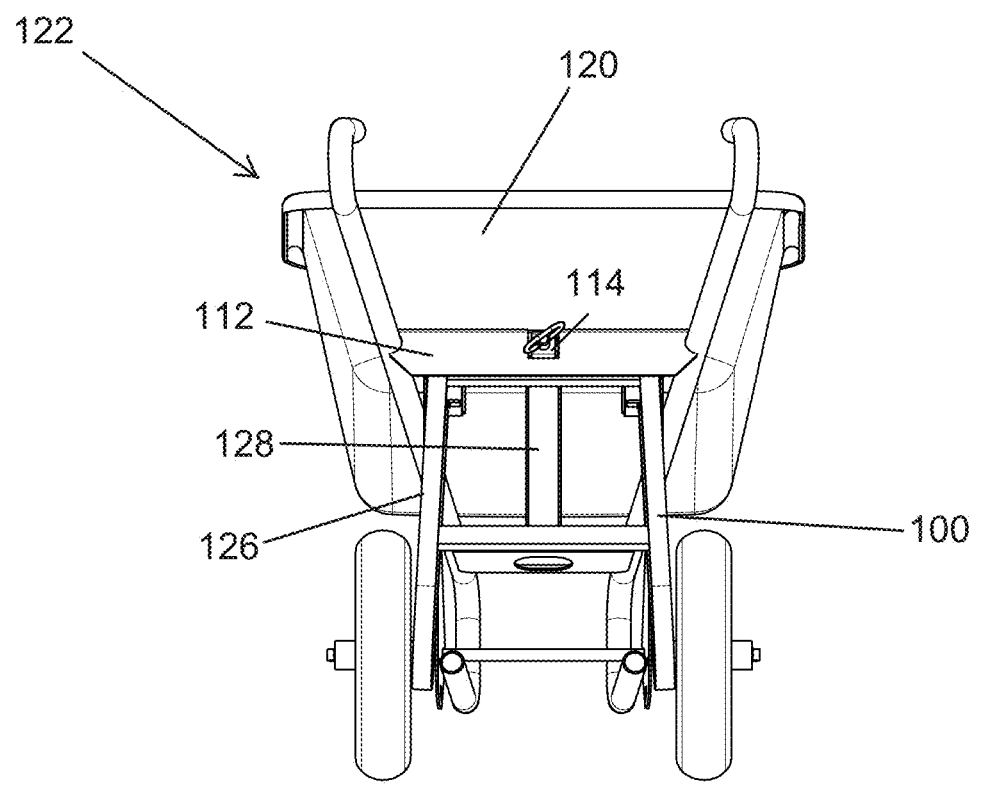
FIG. 25 is a rear view of the removable wheel barrow tub and base frame of FIG. 21.

Referring now to FIG. 24, wheels 108 are shown as being spaced apart from each other to provide additional stability during movement of wheel barrow 122. In addition to the positioning of the wheel beneath the tub, the positioning of the two wheels laterally apart from each other may provide a substantial improvement in the control of loads being moved with wheel barrow 122. Users needing to use the wheel barrow for extended periods of time may be less fatigued. Professionals or frequent users of wheel barrow 122 may be able to work for longer periods of time with less likelihood of injury and casual users may be more capable of moving loads that otherwise might have been beyond their capabilities. Referring now to FIG. 25, rest 126 may include a vertical element 128 that extends up to and engages release mechanism 114 to removably attach rest 126 to base frame 100.

Figure 26:
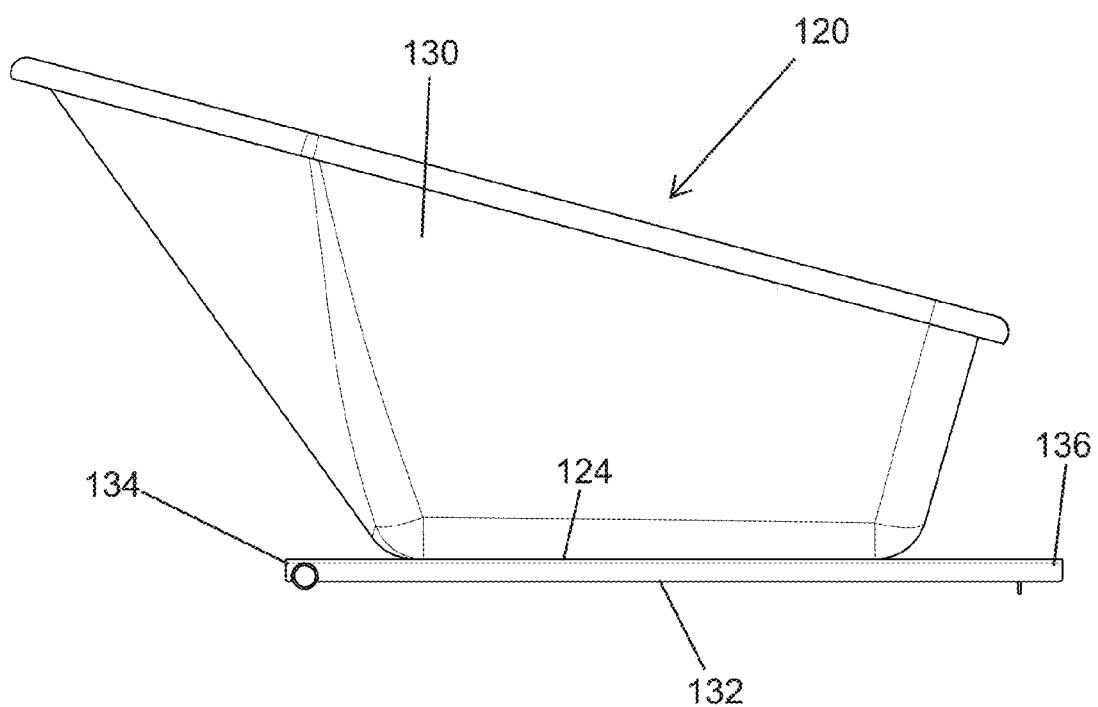
FIG. 26 is a side view of the removable wheel barrow tub of FIG. 21.
Figure 27:
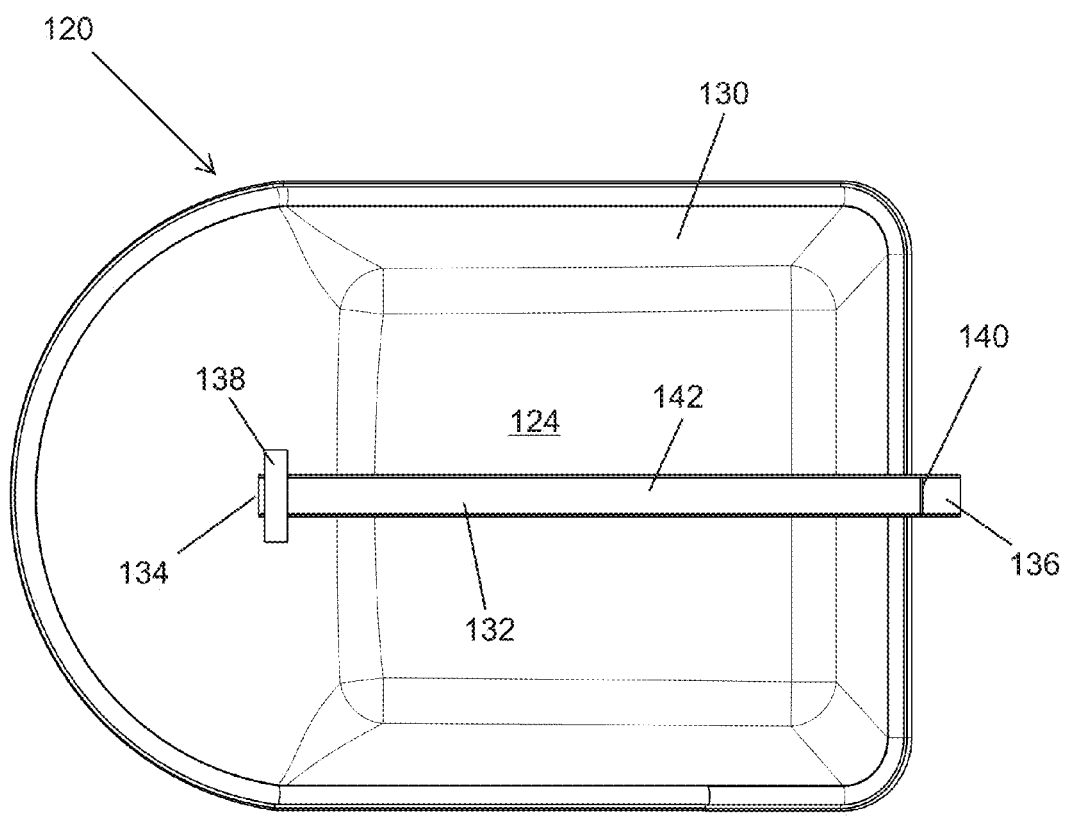
FIG. 27 is a bottom view of the removable wheel barrow tub of FIG. 26.

Referring now to FIGS. 26 and 27, tub attachment 120 may include a load carrying arrangement or tub 130 for receiving and holding material and a yoke 132 configured to releasably engage base frame 100. Additionally, yoke 132 may be preferably attached or connected to bottom edge 124 of tub 130 to further provide structural support to the tub between the frame rails of the base frame. Yoke 132 may have a first or front end 134 configured to releasably engage receiver 116 of base frame 100 and a second or rear end 136 configured to releasably engage release mechanism 114 of base frame 100.

Referring now to FIG. 27, yoke 132 may include a lateral pin 138 at front end 134 for engaging receiver 116. At rear end 136, a bulkhead 140 may be provided to engage pin 118 of release mechanism 114. A structural body 142 may extend between the front and rear ends and provide sufficient resistance deformation to ensure that tub 130 maintains its shape and ensure that bulkhead 140 and pin 138 remain in engagement with base frame 100 until a user decides to selectively remove the tub attachment from the base frame.

Figure 28:
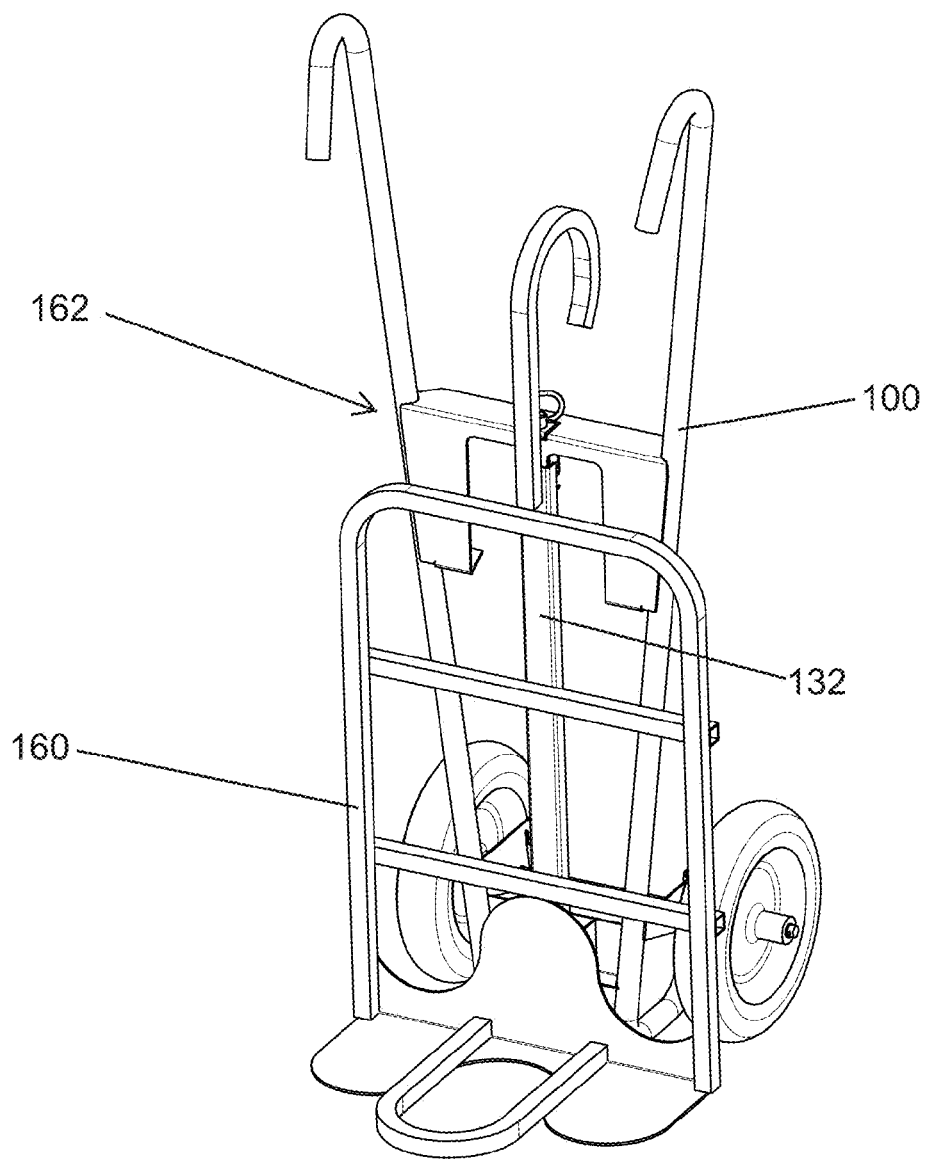
FIG. 28 is a perspective view of an alternative embodiment of a removable hand truck attachment according to the present disclosure mounted to the base frame of FIG. 16.
Figure 29:
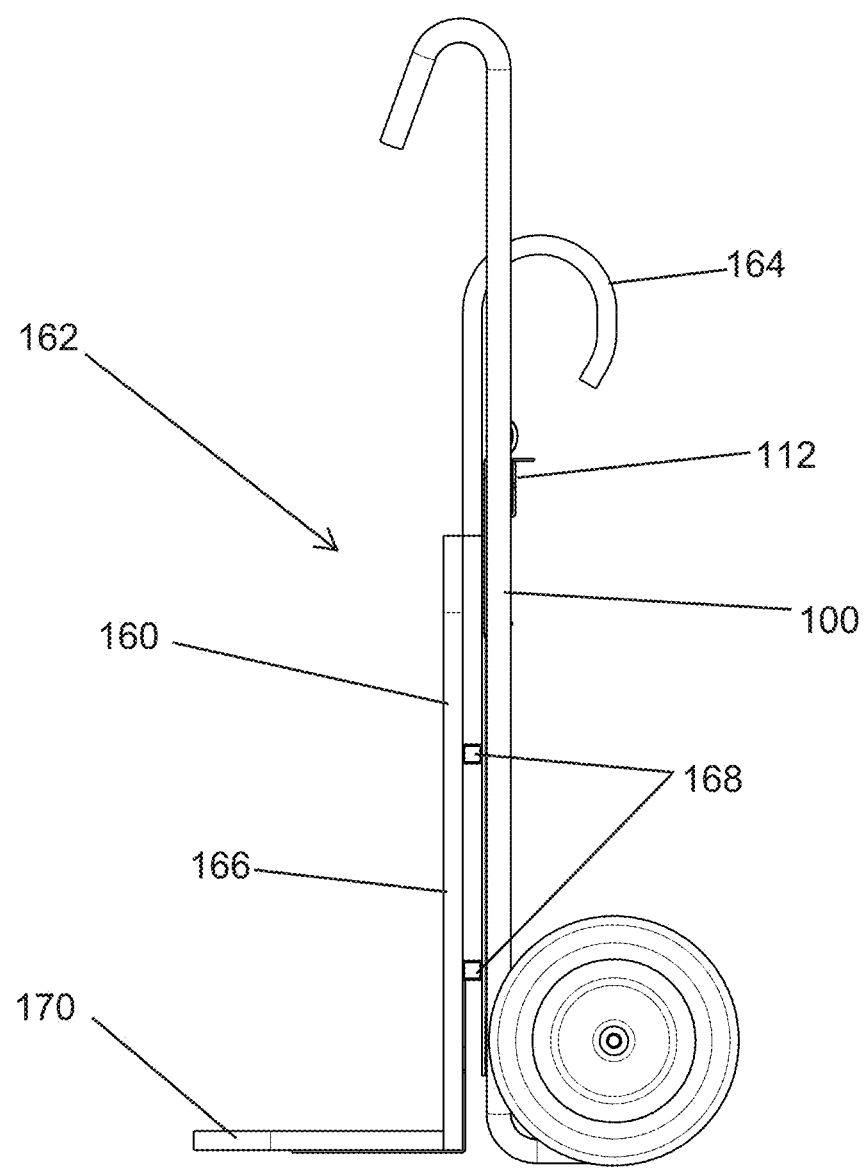
FIG. 29 is a side view of the removable hand truck attachment and base frame of FIG. 28.
Figure 30:
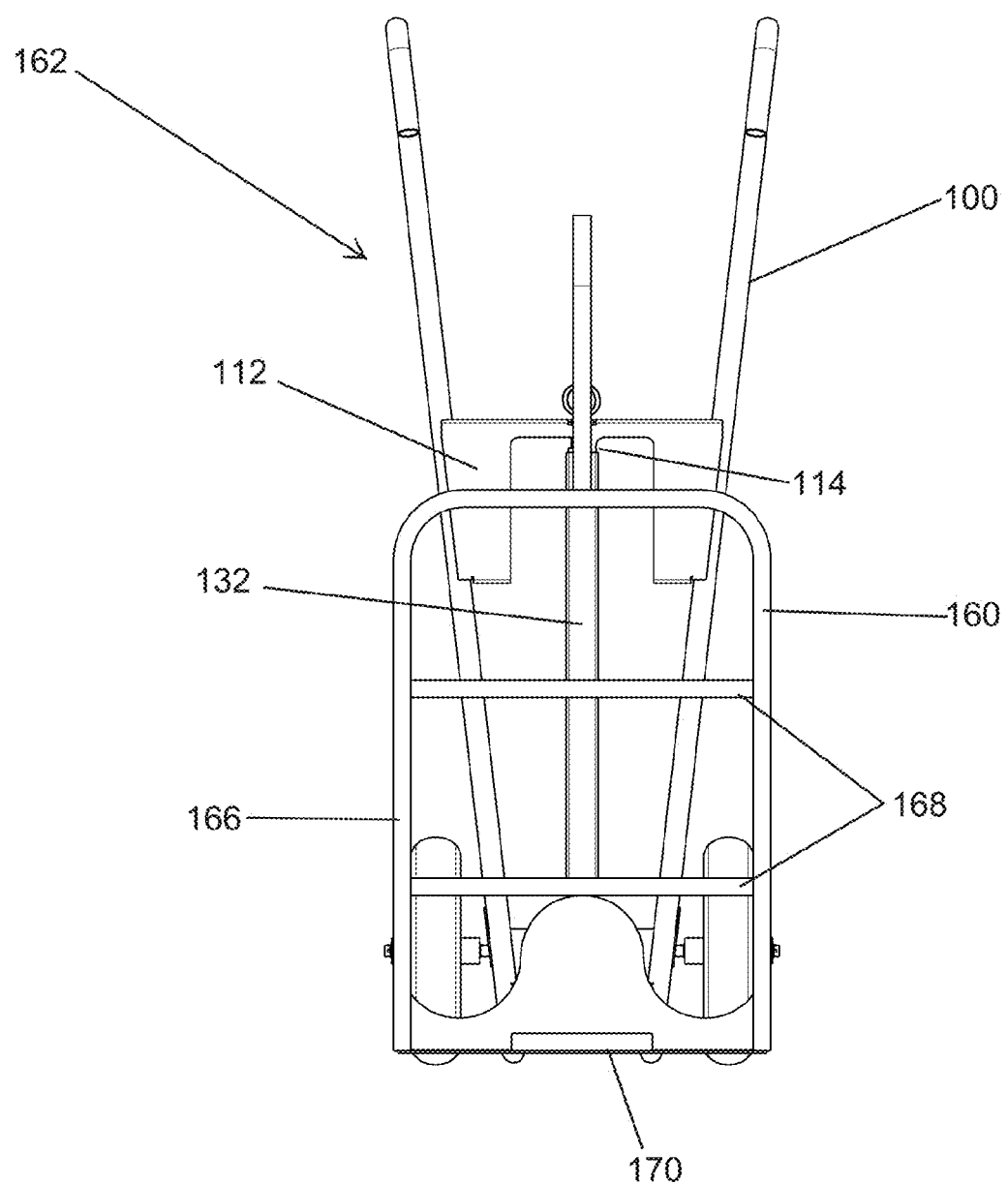
FIG. 30 is a front view of the removable hand truck attachment and base frame of FIG. 28.

Referring now to FIGS. 28 to 30, a hand truck 162 may be comprised of hand truck attachment 160 releasably mounted to base frame 100. Hand truck attachment will preferably incorporate yoke 132 to provide for releasable engagement with base frame 100 as well as additional support to loads being carried or transported by hand truck 162.

Hand truck attachment 160 may include an upper handle 164 to aid in maneuvering hand truck 162 and elevating the desired load. Hand truck attachment 160 may further include one or more transverse support bars 168 that are positioned to rest upon frame rails 102 and 104 to support and stabilize the load being elevated or carried. A vertical frame 166 and a foot 170 may cooperate to define a load carrying arrangement for receiving a load to be elevated or carried. As noted above, preferably wheels 108 are positioned so that hand truck assembly 160 does not impact rotation of the wheels in any way when hand truck attachment 160 is mounted to base frame 100.

Figure 31:
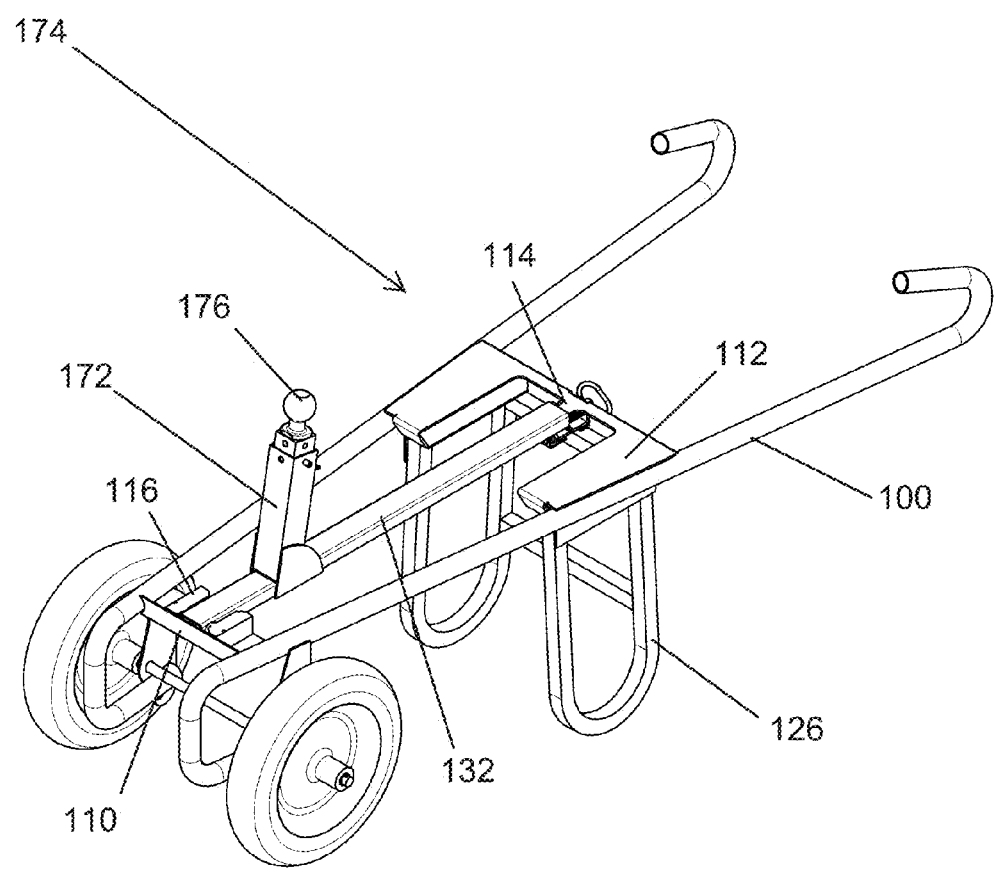
FIG. 31 is a perspective view of an alternative embodiment of a removable trailer dolly attachment according to the present disclosure mounted to the base frame of FIG. 16.
Figure 32:
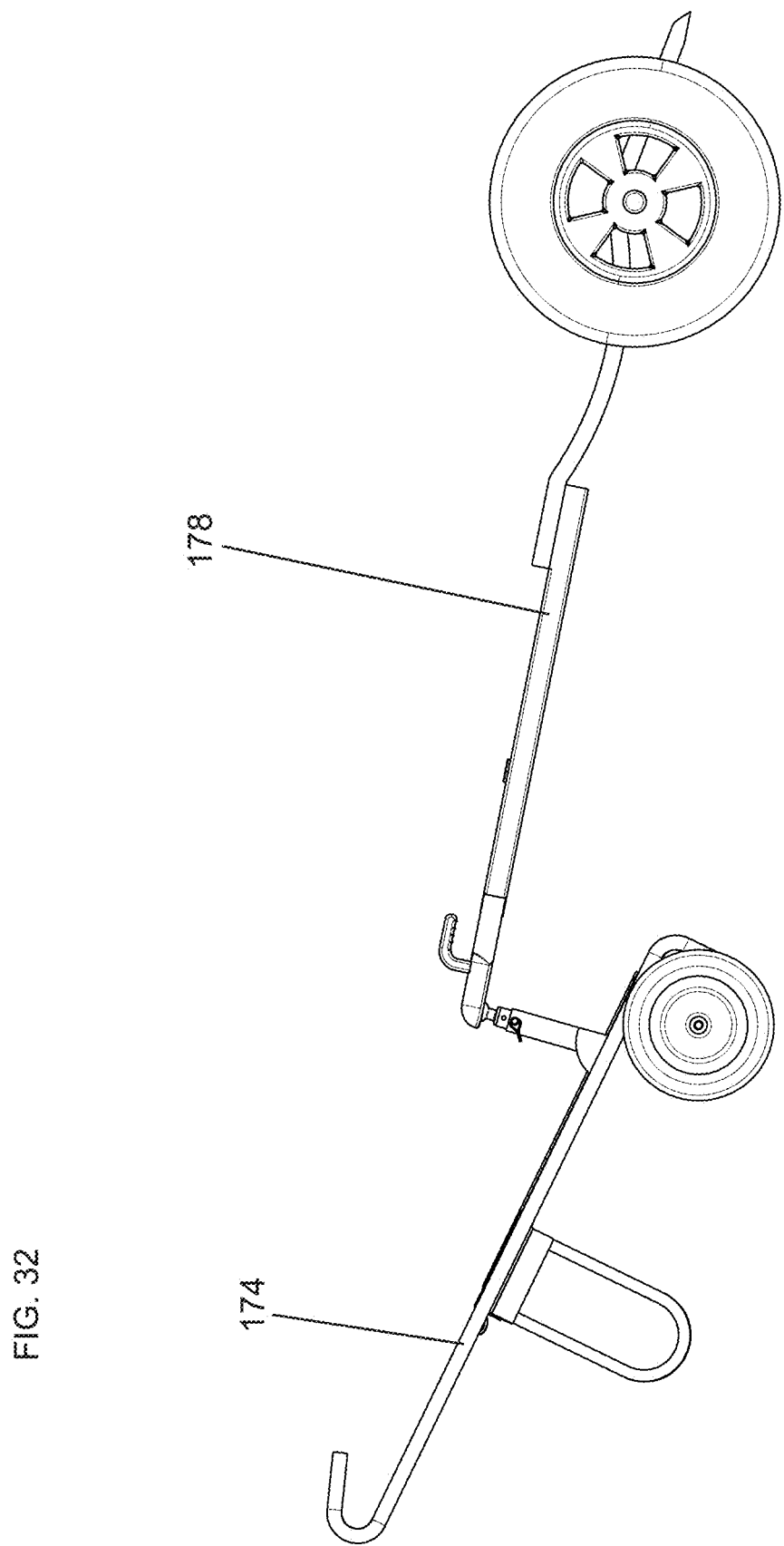
FIG. 32 is a side view of the removable trailer dolly attachment and base frame of FIG. 31, with an exemplary trailer engaged by the removable trailer dolly attachment.

Referring now to FIGS. 31 and 32, a trailer dolly 174 comprises base frame 100 with a trailer dolly attachment 172 releasably mounted to the base frame. Dolly attachment 172 preferably includes a hitch ball 176 to permit the dolly to engage any number of standard hitches to permit trailer dolly to be used to maneuver different trailers or similarly configured devices without needing to attach the trailer to a vehicle. Dolly attachment 172 includes yoke 132 which engages receiver 116 of bracket 110 and release mechanism 114 of bracket 112 to permit easy selective removal or attachment of the dolly attachment to the base frame. It is not intended that the nature of the hitch engagement be limited in the scope of the present disclosure. It is anticipated that dolly attachment 172 may be adapted to permit engagement and movement of a variety of objects. Examples of object that may be moved include but are not limited to boat, snowmobile or ATV trailers, RV trailers, utility trailers, farm trailers, aircraft, garden trailers, etc.

FIG. 32 illustrates use of trailer dolly 172 to engage and move an exemplary trailer 178. Rest 126 may be included as part of trailer dolly 172 to aid in the ease of use of the dolly. The height of hitch ball 176 above the base frame and the height of rest 126 may be adapted as needed based on the height of the trailer hitch to be engaged and how high the hitch may be preferably lifted during movement.

Figure 33:
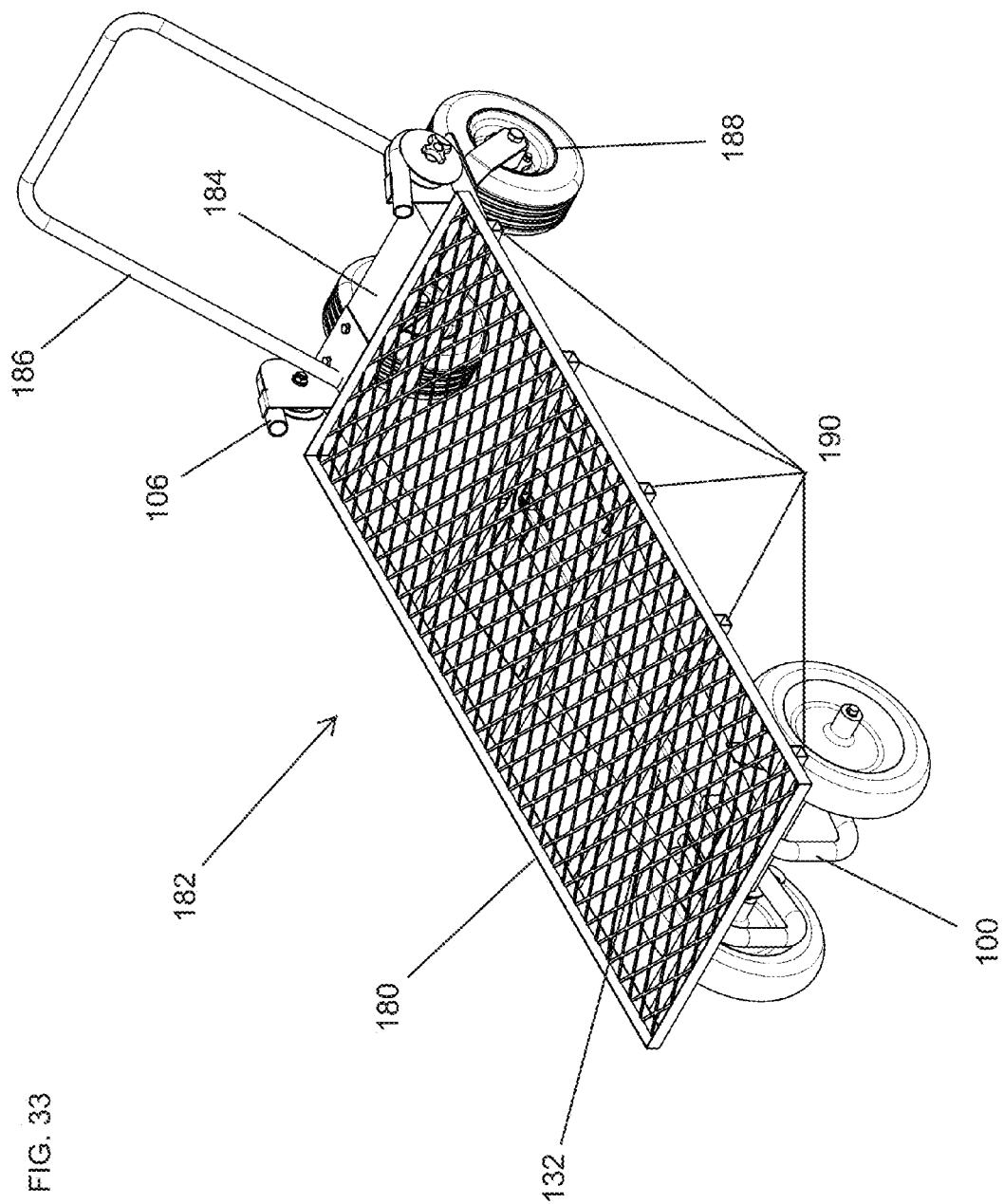
FIG. 33 is a perspective view of an alternative embodiment of a removable flat deck cart attachment and a removable caster bracket according to the present disclosure mounted to the base frame of FIG. 16.
Figure 34:
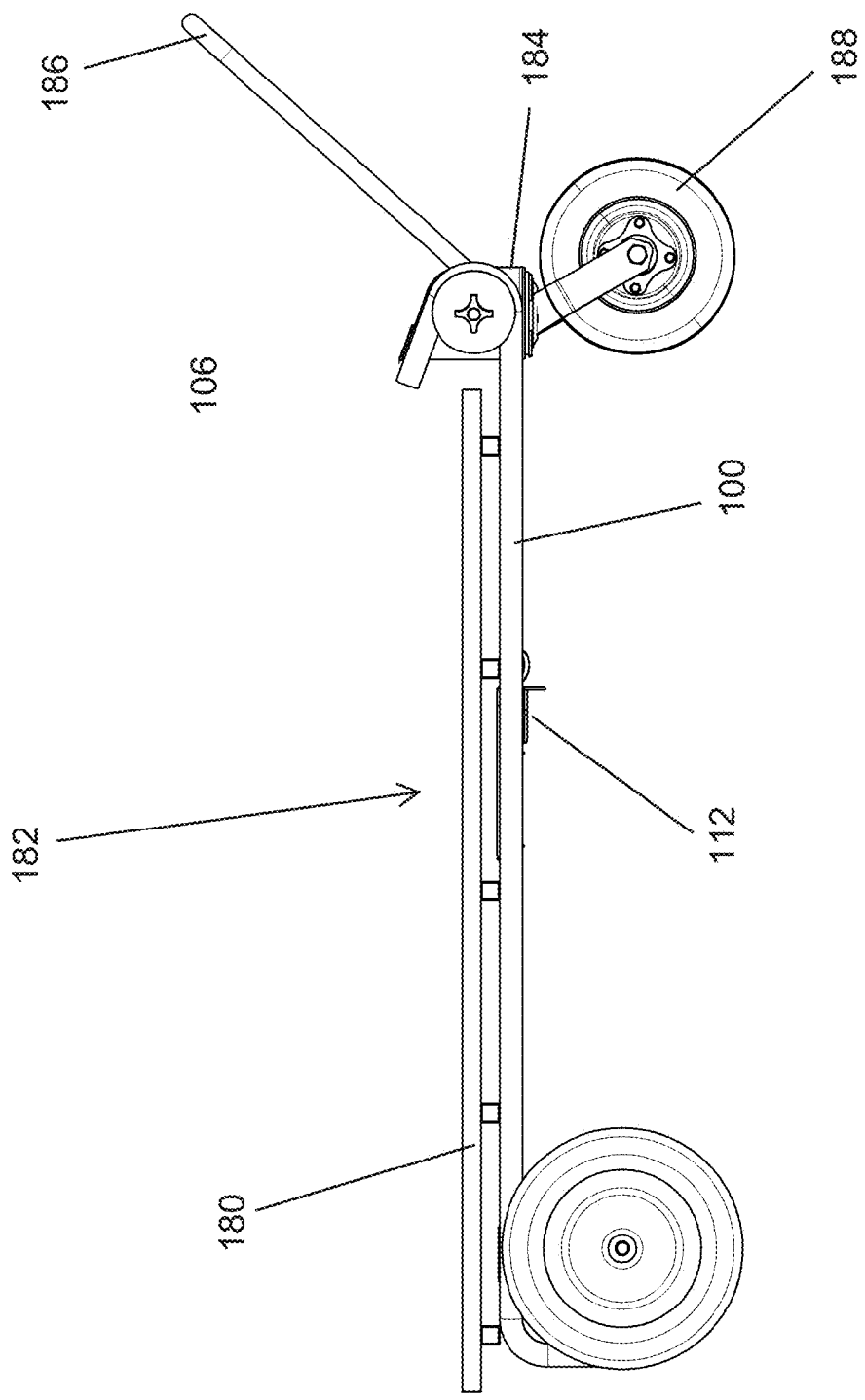
FIG. 34 is a side view of the removable flat deck cart attachment, the removable caster bracket and the base frame of FIG. 33.
Figure 35:
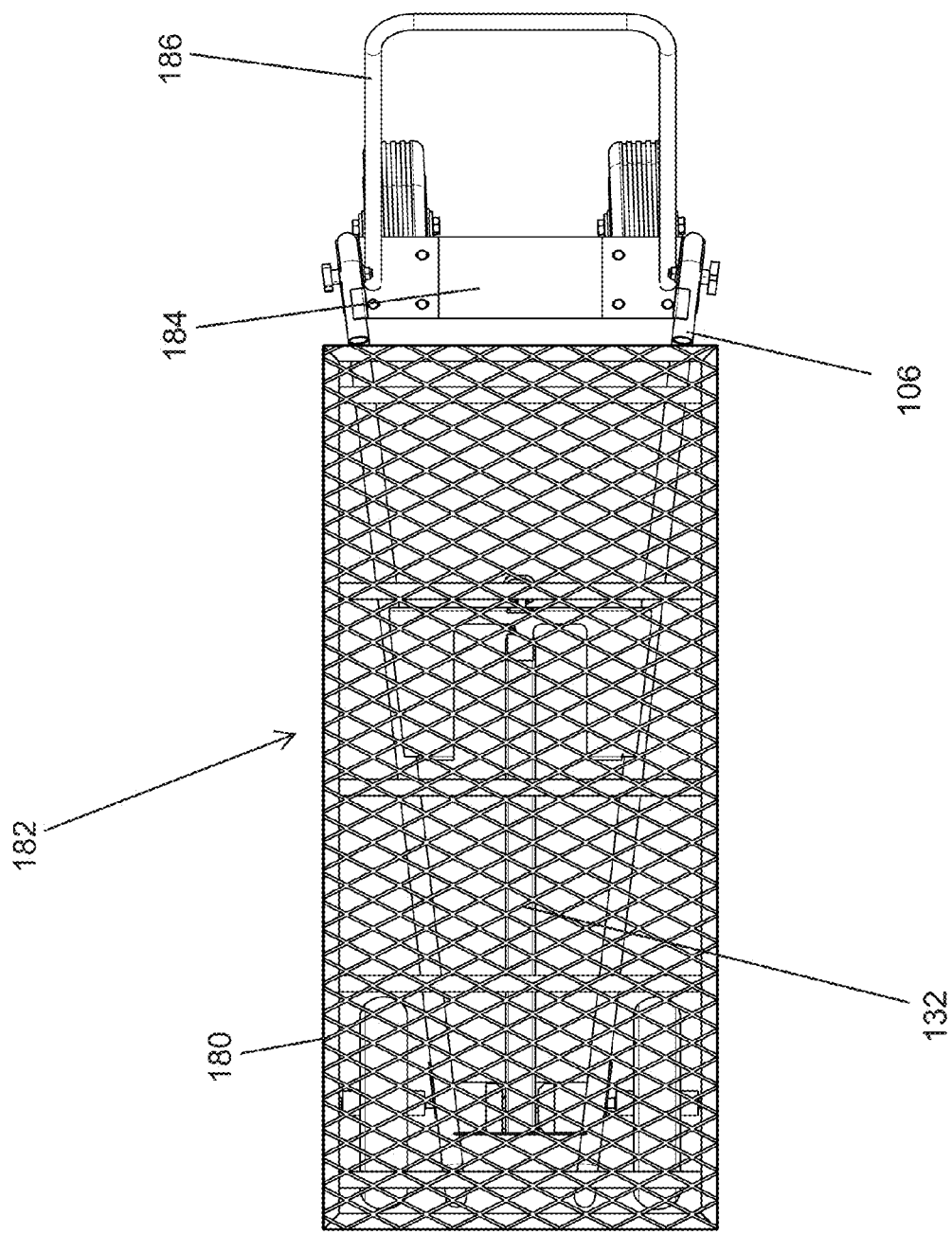
FIG. 35 is a top view of the removable flat deck cart attachment, the removable caster bracket and the base frame of FIG. 33.
Figure 36:
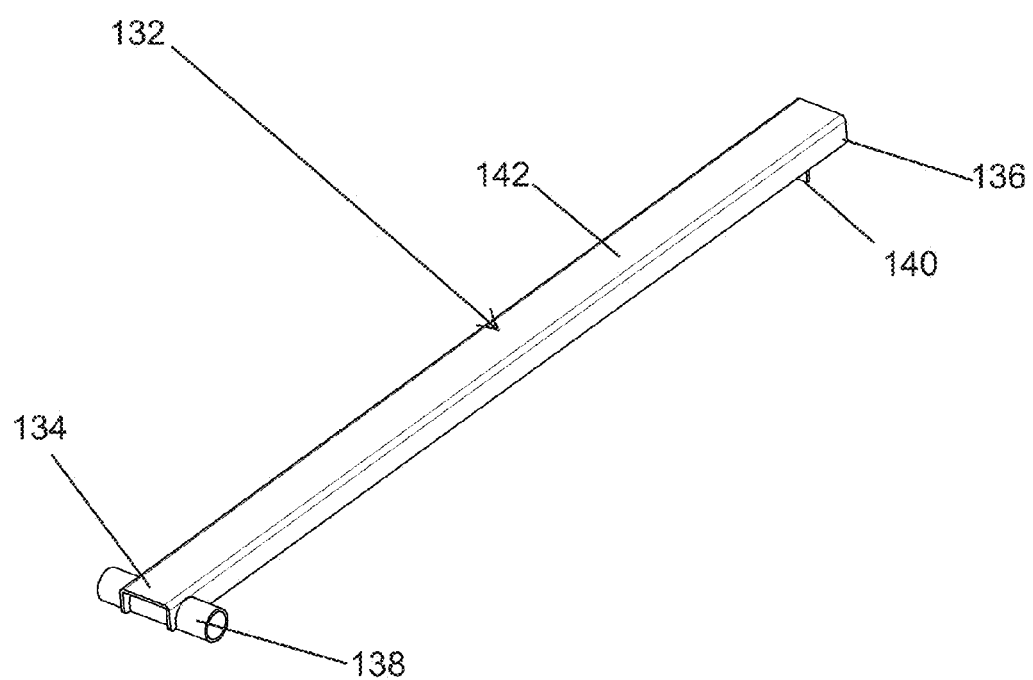
FIG. 36 is a perspective view of an alternative embodiment of a yoke for incorporation with removable attachments for mounting to the base frame of FIG. 16.
Figure 37:
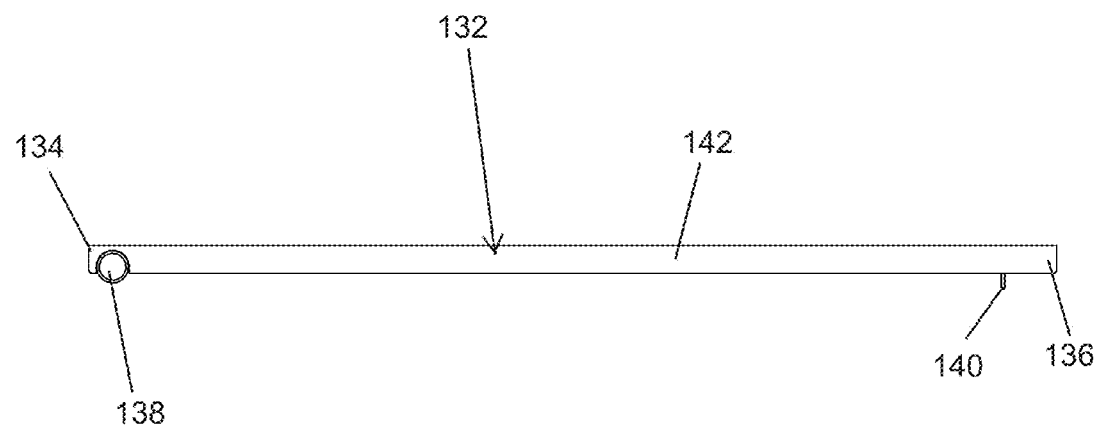
FIG. 37 is a side view of the yoke of FIG. 36.
Figure 38:
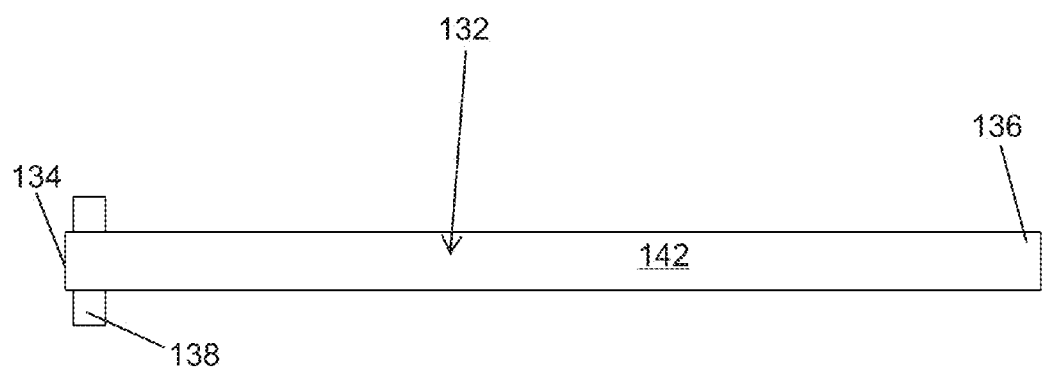
FIG. 38 is a top view of the yoke of FIG. 36.
Figure 39:
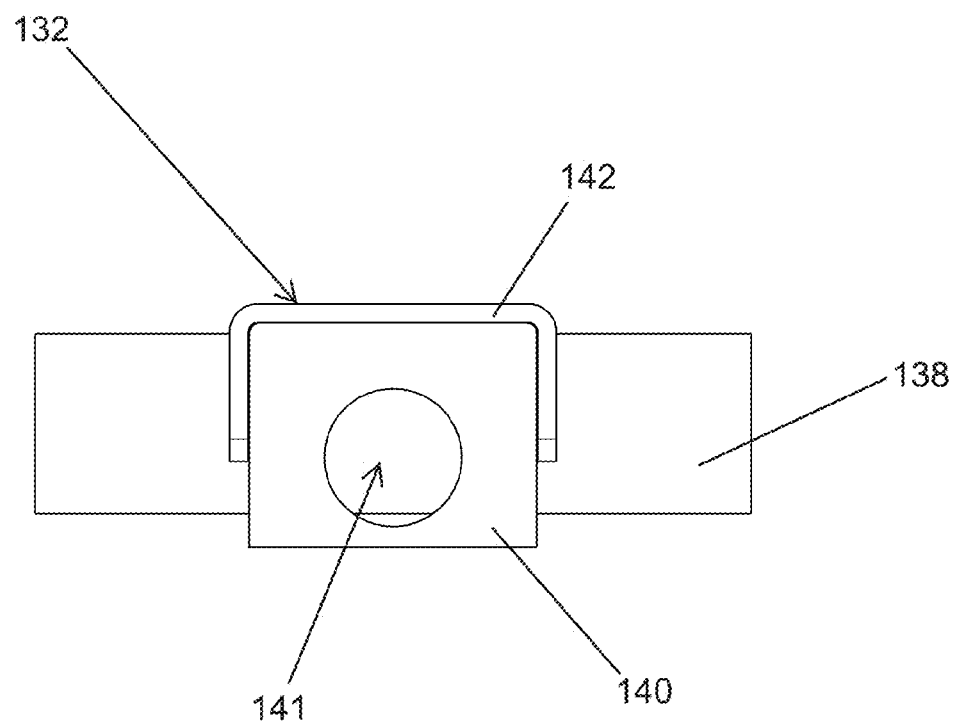
FIG. 39 is a rear view of the yoke of FIG. 36.
Figure 40:
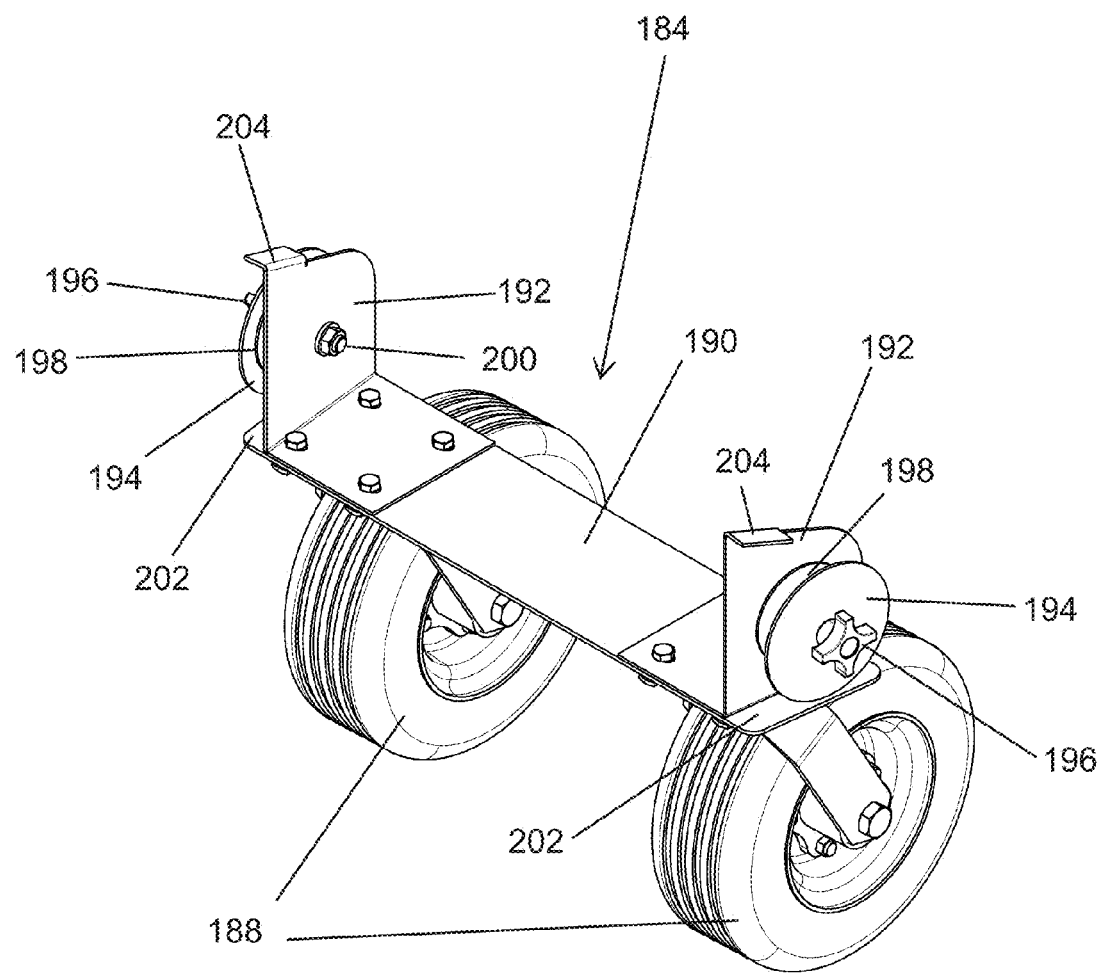
FIG. 40 is a perspective view of the removable caster bracket of FIG. 33.
Figure 41:
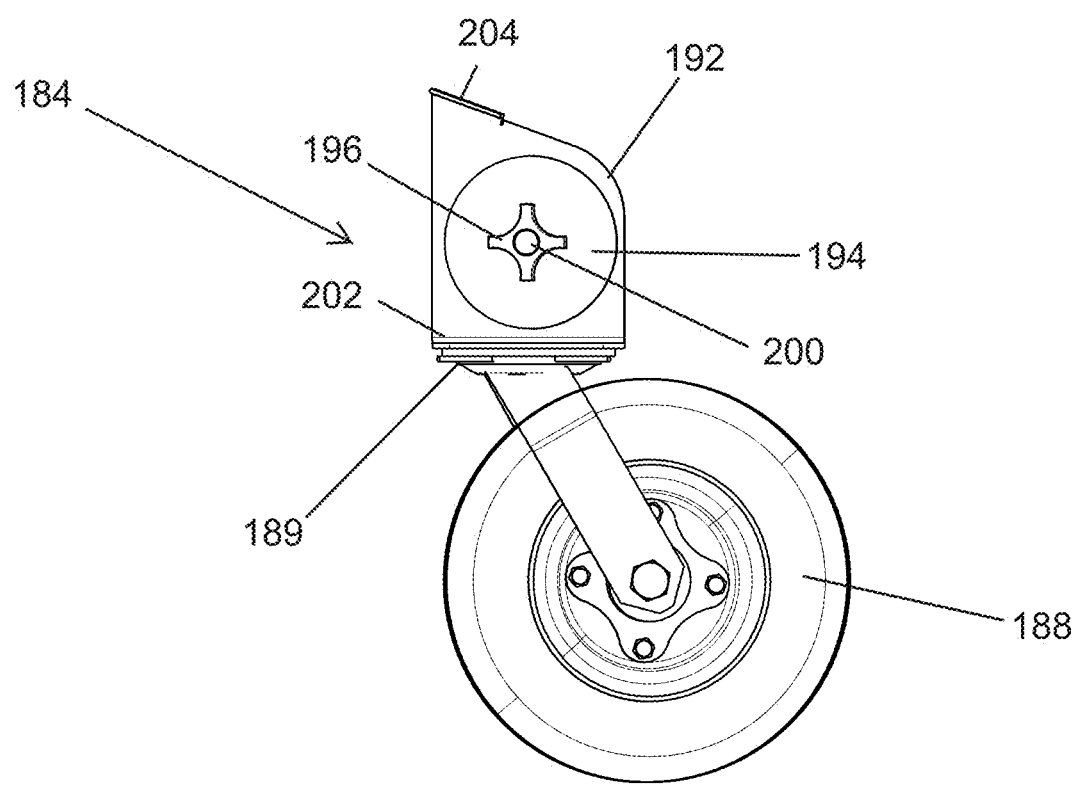
FIG. 41 is a side view of the removable caster bracket of FIG. 40.
Figure 42:
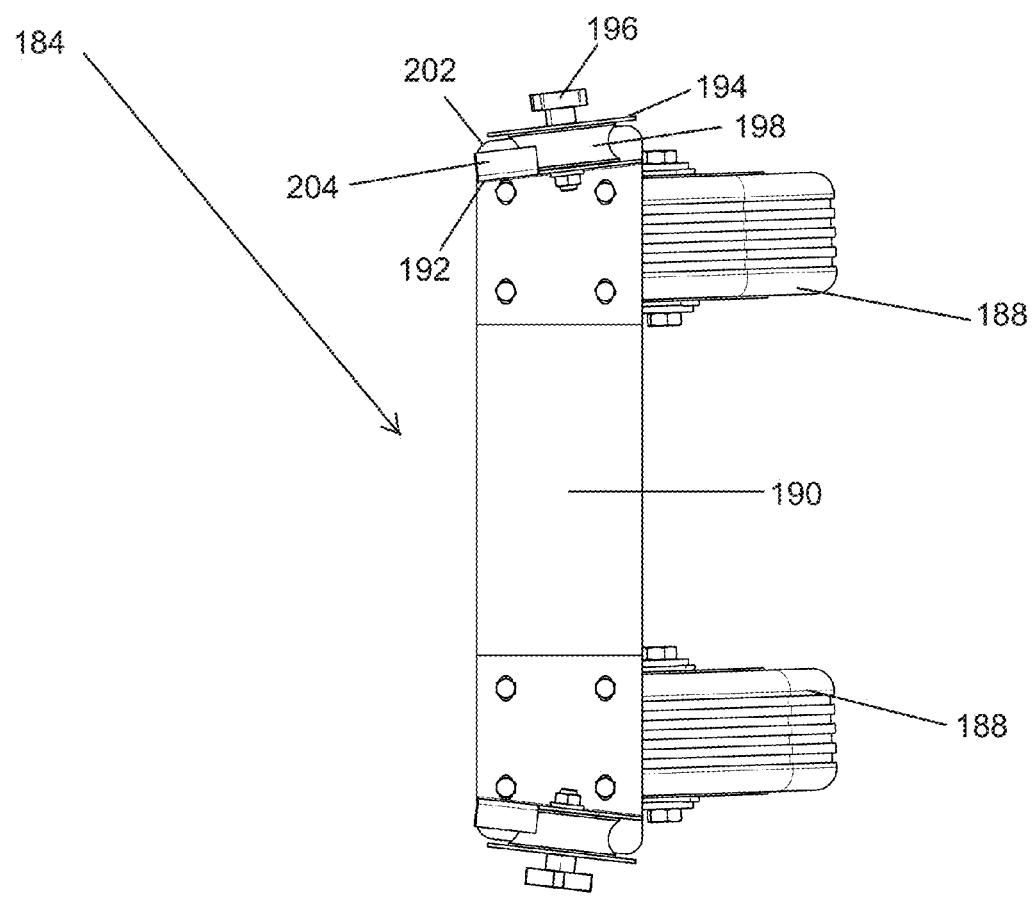
FIG. 42 is a top view of the removable caster bracket of FIG. 40.

Referring now to FIGS. 33 to 35, a flat deck cart 182 may be comprised of a garden cart attachment 180 releasably mounted to base frame 100 by use of yoke 132 and a caster bracket 184 mounted to handles 106 of base frame 100. Caster bracket 184 may also include a handle 186 and one or more swiveling or castering wheels 188 to permit easy movement of the garden cart. A plurality of traverse members 190 may be mounted to a back side of a load carrying arrangement of flat deck cart attachment 180 and configured to rest upon the tops of frame rails 102 and 104. This will prevent flat deck cart attachment 180 from interfering with the free movement of wheels 108 as flat deck cart 182 is loaded and maneuvered.

Referring now to FIGS. 36 to 39, yoke 132 includes member 142 with transverse pin 138 at first end 134 and bulkhead 140 adjacent second end 136. Bulkhead 140 may include an opening 141 for receiving pin 118 of release mechanism 114. If other types or styles of release mechanisms are incorporated into the base frame of the present disclosure, then yoke 132 may be adapted within the scope of the present disclosure to engage such mechanisms.

Referring now to FIGS. 40 to 44, caster bracket 184 may include a base member 190 with a pair of brackets 192 positioned adjacent at either end and on top of base member 190. Castering wheels 188 are mounted beneath brackets 192 via a swiveling attachment 189. Each bracket 192 includes a central bolt or threaded member 200 with a release nut 196 mounted at an outboard end. Between release nut 196 and bracket 192 are a plate 194 and a spacer 198. Base member 190 extends outward beyond each bracket 192 and forms a lower lip 202. An opposing upper lip 204 is formed at the top of each bracket 192.

Figure 43:
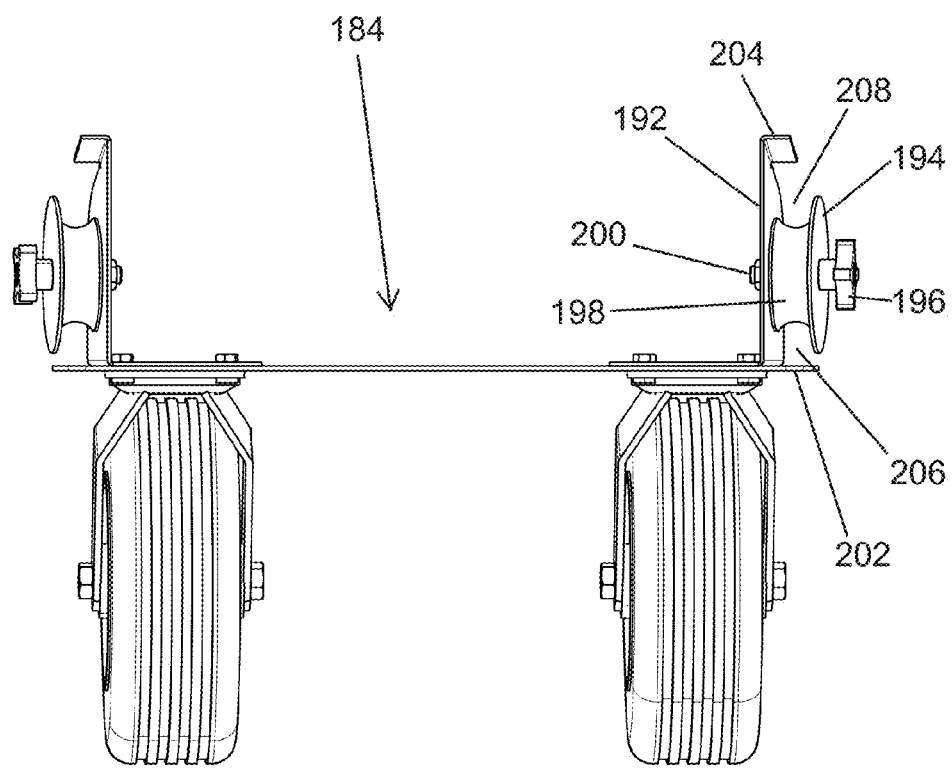
FIG. 43 is a front view of the removable caster bracket of FIG. 40.
Figure 44:
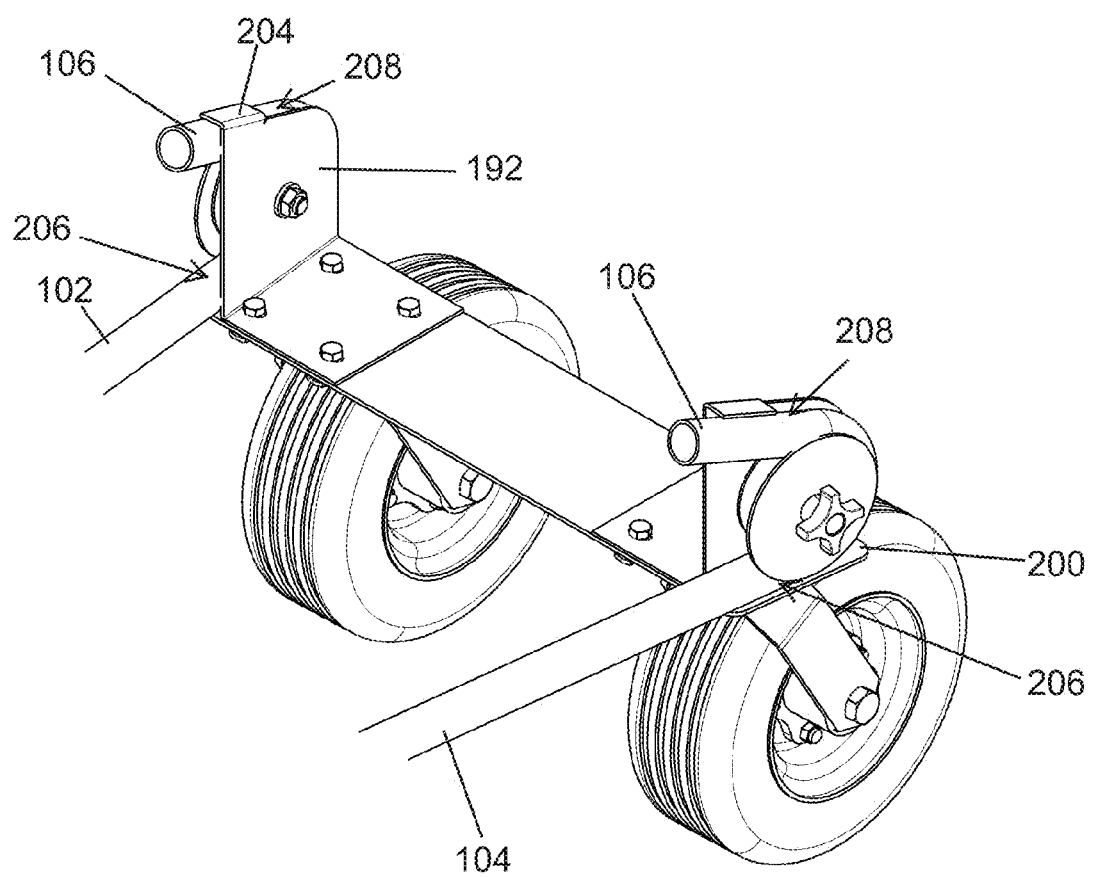
FIG. 44 is a closer perspective view of the removable caster bracket of FIG. 40 mounted to the base frame of FIG. 16.

Referring now to FIG. 43, adjacent each bracket 192 and defined by bracket 192, lower lip 202, spacer 198, and plate 194 is a lower opening 206 for receiving a frame rail 102 or 104, depending on the side of the caster bracket. An upper opening 208 is defined by bracket 192, upper lip 204, spacer 198 and plate 194 for receiving a handle 106. This arrangement is more clearly shown in FIG. 44. To position caster bracket 184 onto base frame 100, nuts 196 would be loosened to permit plate 194 to move outward. When plate 194 is sufficiently removed outward from bracket 192, a frame rail and handle may be positioned within openings 206 and 208, respectively. Nut 196 may then be tightened to draw plate 194 toward bracket 192 and capture the frame rail and handle securely to caster bracket 184. Upper and lower lips 202 and 204, respectively, prevent the frame rail and handle from moving up or down from openings 206 and 208, respectively, while plate 194 and bracket 192 secure the bracket and base frame laterally with respect to each other.

By engaging both the frame rails and the handles, the caster bracket may be held very securely to the base frame and should be able to withstand significant loads or forces being applied to the handle. This attachment approach provides a plurality of contact points on multiple locations along the base frame.

Figure 45:
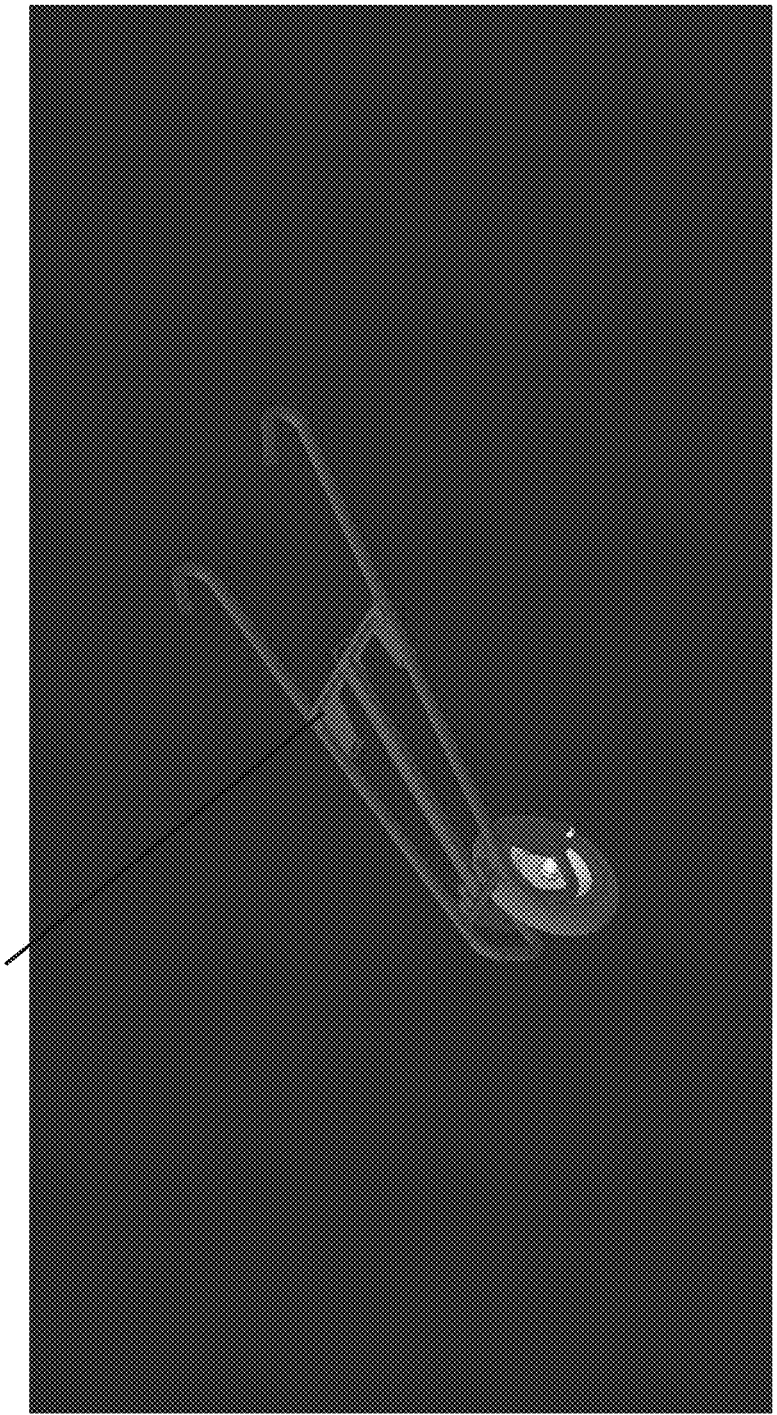
FIG. 45 is a perspective view of a second alternative embodiment of a base frame according to the present disclosure.
Figure 46:
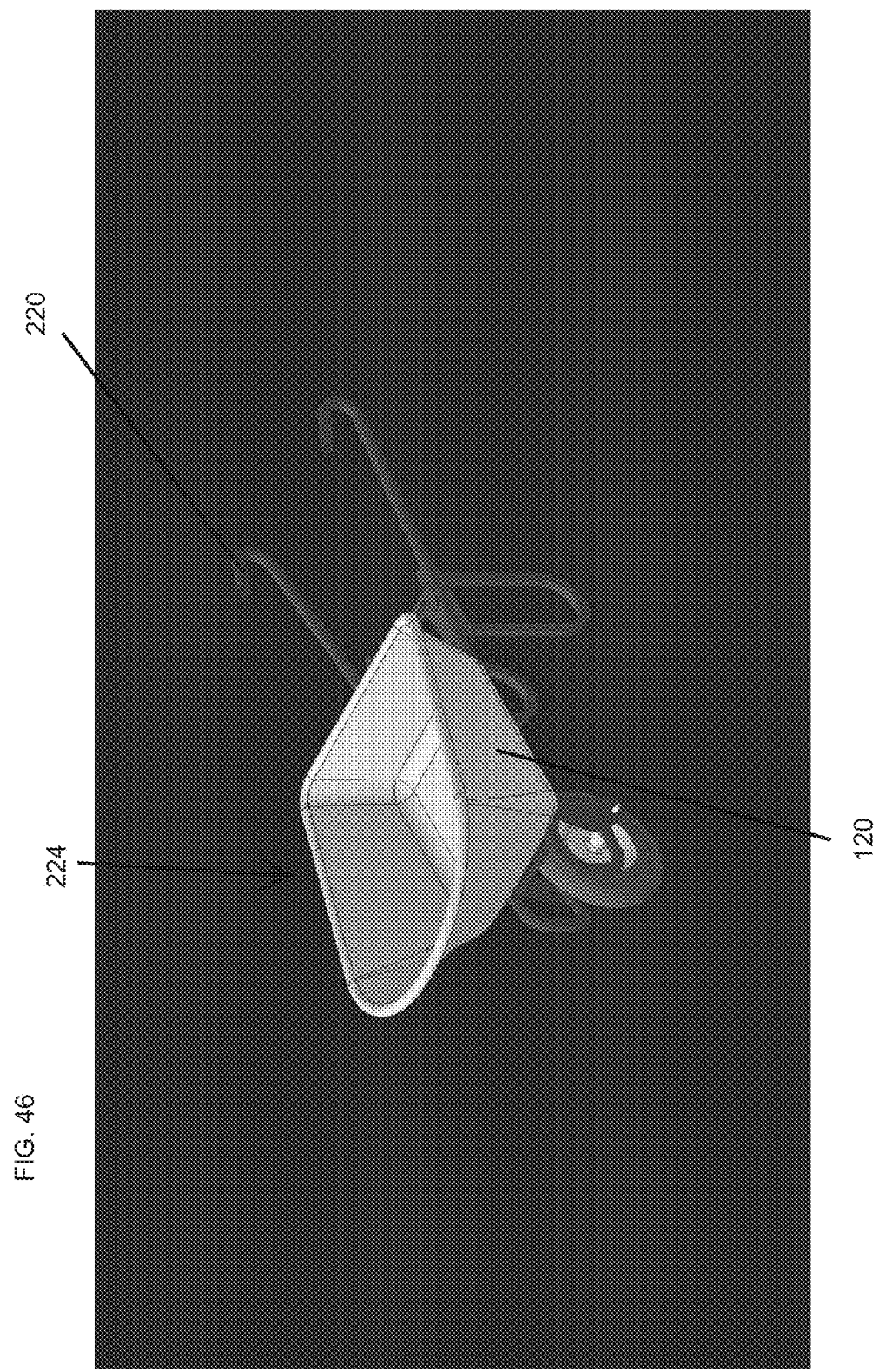
FIG. 46 is a perspective view of the base frame of FIG. 45 and the removable wheel barrow tub of FIG. 26.

While the foregoing description has contemplated that the base frame will incorporate two wheels, it is anticipated that the adaptable nature of the wheeled carrier of the present disclosure may be incorporated into a single wheel design or a four wheel design within the scope of the present disclosure. It is not intended to limit the present disclosure to simply dual wheeled designs. FIGS. 45 and 46 illustrate a single wheeled base frame 220 and a single wheeled wheel barrow 224 comprising wheel barrow tub attachment 120 releasably mounted to the base frame 220 in accordance with the present disclosure. The single wheel variant of this disclosure may provide added leverage and load control to the user when compared to current available designs.

FIGS. 47 to 49 illustrate a rest 230 that may be attached to the base frame more or less permanently. Rest 230 may be moved between two positions where in a first position rest 230 is configured for use as a wheel barrow 232 (see FIG. 47) and where in a second position rest 230 is configured for use as a hand truck 234 (see FIG. 48) or as a flat deck cart 236 (see FIG. 49). Such an arrangement might simplify the alteration of the wheel carrier of the present disclosure for use in different roles.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A wheeled carrier for manual movement of material by a user, the wheeled carrier comprising:
   a base frame including a pair of frame rails extending from a front end to a rear end;
      the frame rails turned down at the front end and a first bracket connecting the frame rails adjacent the front end, the first bracket providing a mounting point for at least one wheel so that the at least one wheel does not extend above a top of either of the frame rails, the first bracket further including a receiver positioned between the frame rails;
   a second bracket extending between the frame rails at a point between the first bracket and the rear ends of the frame rails, the second bracket including a release mechanism positioned between the frame rails;

at least one attachment including a yoke, the yoke configured to extend between the receiver of the first bracket and the release mechanism of the second bracket, a rear end of the yoke configured to releasably engage the release mechanism and a front end of the yoke configured to be received within the receiver of the first bracket;

the at least one attachment further including a load carrying arrangement extending from the yoke, the load carrying arrangement configured to rest on the frame rails above the at least one wheel without engaging the wheel.

2. The wheeled carrier of claim 1, the rear end of each frame rail turned up and extending back along the frame rail to form a handle for grasping by a user.

3. The wheeled carrier of claim 1, further comprising a pair of wheels mounted to the first bracket.

4. The wheeled carrier of claim 3, further comprising the wheels mounted to the first bracket outside of the frame rails.

5. The wheeled carrier of claim 1, further comprising a single wheel mounted to the first bracket between the frame rails.

6. The wheeled carrier of claim 1, further comprising the front end of the yoke including a transverse pin and the receiver of the first bracket including a slot to receive the transverse pin.

7. The wheeled carrier of claim 1, further comprising the rear end of the yoke including a bulkhead with an opening and the release mechanism including a spring loaded pin configured to be received within the opening of the bulkhead to permit the attachment to be selectively attached and detached from the base frame.

8. The wheeled carrier of claim 1, further comprising the at least one attachment is a wheel barrow attachment and a tub of the wheel barrow attachment rests on the frame rails. On either side of the yoke.

9. The wheeled carrier of claim 8, further comprising a rest extending from the second bracket oppositely from the tub and configured to raise the handles of the frame rails off the ground.

10. The wheeled carrier of claim 1, further comprising the at least one attachment is a flat deck cart attachment and the load surface of the flat deck cart attachment is supported by the frame rails on either side of the yoke.

11. The wheeled carrier of claim 10, further comprising a caster bracket mounted to the handles of the frame rails, the caster bracket including at least one swiveling wheel to support the handles of the frame rails off the ground so that the load surface of the flat deck cart attachment is generally parallel to the ground.

12. The wheeled carrier of claim 1, further comprising the at least one attachment is a hand truck attachment and at least one load surface of the hand truck attachment is supported by the frame rails on either side of the yoke.

13. The wheeled carrier of claim 1, further comprising the at least one attachment is a trailer dolly attachment.

14. The wheeled carrier of claim 1, further comprising a rest extending from the second bracket oppositely from the yoke, the rest being movable between a first position where the rest extends further than the at least one wheel and is configured to hold the handles off the ground and a second position where the rest does not extend further than the at least one wheel.

* * * * *